(12) United States Patent
Selim et al.

(10) Patent No.: US 11,694,424 B2
(45) Date of Patent: Jul. 4, 2023

(54) PREDICTIVE DATA ANALYSIS USING IMAGE REPRESENTATIONS OF CATEGORICAL DATA TO DETERMINE TEMPORAL PATTERNS

(71) Applicant: Optum Services (Ireland) Limited, Dublin (IE)

(72) Inventors: Ahmed Selim, Dublin (IE); Kieran O'Donoghue, Dublin (IE); Michael Bridges, Dublin (IE); Mostafa Bayomi, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 245 days.

(21) Appl. No.: 17/237,818

(22) Filed: Apr. 22, 2021

(65) Prior Publication Data

US 2022/0343104 A1 Oct. 27, 2022

(51) Int. Cl.
*G06V 10/44* (2022.01)
*G06N 20/00* (2019.01)
*G06V 10/75* (2022.01)
*G06F 18/214* (2023.01)

(52) U.S. Cl.
CPC ............ *G06V 10/44* (2022.01); *G06F 18/214* (2023.01); *G06N 20/00* (2019.01); *G06V 10/7557* (2022.01)

(58) Field of Classification Search
CPC .. G06V 10/44; G06V 10/778; G06V 10/7557; G06V 10/82; G06V 30/19; G06V 30/148; G06F 18/214; G06N 20/00

USPC .......................................................... 382/190
See application file for complete search history.

(56) References Cited

U.S. PATENT DOCUMENTS

| | | | |
|---|---|---|---|
| 9,342,579 B2 | 5/2016 | Cao et al. | |
| 10,223,501 B1 | 3/2019 | Schneider et al. | |
| 10,235,605 B2 * | 3/2019 | Criminisi | G06F 18/24317 |
| 10,891,352 B1 | 1/2021 | Hane et al. | |
| 11,144,800 B2 * | 10/2021 | Tang | G06V 20/35 |
| 2015/0065803 A1 | 3/2015 | Douglas et al. | |
| 2015/0297172 A1 | 10/2015 | Takagi et al. | |
| 2016/0055427 A1 | 2/2016 | Adjaoute | |
| 2016/0364862 A1 | 12/2016 | Reicher et al. | |
| 2017/0091401 A1 | 3/2017 | Kemp | |
| 2017/0178321 A1 | 6/2017 | Nieves et al. | |
| 2017/0308981 A1 | 10/2017 | Razavian et al. | |
| 2018/0268320 A1 | 9/2018 | Shekhar | |
| 2018/0315507 A1 | 11/2018 | Mortazavi et al. | |

(Continued)

OTHER PUBLICATIONS

Final Office Action for U.S. Appl. No. 16/670,615, dated Oct. 18, 2021, (31 pages), United States Patent and Trademark Office, USA.

(Continued)

*Primary Examiner* — Neil R McLean
(74) *Attorney, Agent, or Firm* — Alston & Bird LLP

(57) ABSTRACT

There is a need for more effective and efficient predictive data analysis solutions and/or more effective and efficient solutions for generating image representations of categorical data. In one example, embodiments comprise receiving a categorical input feature, generating an image representation of the categorical input feature, generating an image-based prediction based at least in part on the image representation, and performing one or more prediction-based actions based at least in part on the image-based prediction.

20 Claims, 33 Drawing Sheets

(56) References Cited

U.S. PATENT DOCUMENTS

| | | |
|---|---|---|
| 2018/0330808 A1 | 11/2018 | Xie et al. |
| 2019/0005410 A1 | 1/2019 | Shekhar et al. |
| 2019/0080416 A1 | 3/2019 | Smith et al. |
| 2019/0295228 A1 | 9/2019 | Liu et al. |
| 2020/0034366 A1 | 1/2020 | Kivatinos et al. |
| 2020/0151444 A1 | 5/2020 | Price et al. |
| 2020/0320139 A1 | 10/2020 | Duishoev et al. |
| 2020/0381090 A1 | 12/2020 | Apostolova et al. |
| 2021/0027194 A1 | 1/2021 | Monaghan et al. |
| 2021/0133455 A1 | 5/2021 | Selim et al. |
| 2021/0133959 A1 | 5/2021 | Selim et al. |
| 2021/0134438 A1 | 5/2021 | Selim et al. |
| 2021/0134439 A1 | 5/2021 | Selim et al. |
| 2022/0405928 A1 | 12/2022 | Selim et al. |

OTHER PUBLICATIONS

Notice of Allowance and Fee(s) Due for U.S. Appl. No. 16/670,504, dated Oct. 18, 2021, (11 pages), United States Patent and Trademark Office, USA.

Corrected Notice of Allowability for U.S. Appl. No. 16/670,615, dated Apr. 15, 2022, (3 pages), United States Patent and Trademark Office, Alexandria, Virginia, US.

Notice of Allowance and Fee(s) Due for U.S. Appl. No. 16/670,546, dated Dec. 20, 2021, (11 pages), United States Patent and Trademark Office, USA.

Cai, Xiangrui et al. "Medical Concept Embedding With Time-Aware Attention," arXiv preprint arXiv: 1806.02873v1, Jun. 6, 2018, (7 pages).

Choi, Edward et al. "MiME: Multilevel Medical Embedding of Electronic Health Records for Predictive Healthcare," arXiv preprint arXiv: 1810.09593v1, Oct. 22, 2018, (17 pages).

Geng, Yujuan et al. Patient Outcome Prediction via Convolutional Neural Networks Based on Multi-Granularity Medical Concept Embedding, 2017 IEEE International Conference on Bioinformatics and Biomedicine (BIBM), Nov. 13-16, 2017, pp. 770-777,, Kansas City, MO, USA. DOI: 10.1109/BIBM.2017.8217753.

Guo, Cheng et al. "Entity Embedddings of Categorical Variables," arXiv preprint arXiv:1604.06737v1, Apr. 22, 2016, (9 pages).

Landi, Isotta et al. "Deep Representation Learning of Electronic Health Records to Unlock Patient Stratification at Scale," NPJ|Digital Medicine, vol. 3, No. 1, pp. 1-11, Jul. 17, 2020.

NonFinal Office Action for U.S. Appl. No. 16/670,504, filed Mar. 9, 2021, (19 pages), United States Patent and Trademark Office, USA.

NonFinal Office Action for U.S. Appl. No. 16/670,656, dated Jan. 24, 2022, (42 pages), United States Patent and Trademark Office, USA.

Notice of Allowance and Fee(s) Due for U.S. Appl. No. 16/670,615, dated Mar. 4, 2022, (16 pages), United States Patent and Trademark Office, USA.

NonFinal Office Action for U.S. Appl. No. 16/670,546, dated Aug. 13, 2021, (39 pages), United States Patent and Trademark Office, USA.

NonFinal Office Acton for U.S. Appl. No. 16/670,615, dated Jun. 16, 2021, (28 pages), United States Patent and Trademark Office, USA.

Notice of Allowance and Fee(s) Due for U.S. Appl. No. 16/670,656, dated Jun. 20, 2022, (17 pages), United States Patent and Trademark Office, USA.

Final Office Action for U.S. Appl. No. 16/670,504, dated Jul. 26, 2021, (28 pages), United States Patent and Trademark Office, USA.

\* cited by examiner

1900

Generate a cumulative expanded representation
1901

Generate a historical representation
1902

Select an expanded representation set
2201

↓

Generate a compact event representation
2202

Generate a predecessor subset of the plurality of compact event representations
2501

Generate a cumulative compact event representation based on the predecessor subset
2502

Generate a historical representation based at least in part on each cumulative compact event representation
2503

Generate a plurality of compact representations
2701

Generate a cumulative compact event representation for each structure text input feature type comprising the plurality of categorical input features
2702

Generate a historical representation using a feature type aggregation machine learning model
2703

FIG. 27

PREDICTIVE DATA ANALYSIS USING IMAGE REPRESENTATIONS OF CATEGORICAL DATA TO DETERMINE TEMPORAL PATTERNS

BACKGROUND

Various embodiments of the present invention address technical challenges related to performing predictive data analysis in a computationally efficient and predictively reliable manner. Existing predictive data analysis systems are ill-suited to efficiently and reliably perform predictive data analysis in various domains, such as domains that are associated with high-dimensional categorical feature spaces with a high degree of cardinality. Further, existing predictive data analysis system are unable to determine the evolution of temporal patterns.

BRIEF SUMMARY

In general, embodiments of the present invention provide methods, apparatuses, systems, computing devices, computing entities, and/or the like dynamically generating an image-based prediction based at least in part on a categorical input feature associated with an event.

In accordance with one aspect, a method includes: receiving, using one or more processors, the categorical input feature, wherein the categorical input feature comprises a plurality of character patterns for a plurality of character pattern positions, wherein each character pattern position is associated with a plurality of candidate character patterns; generating, using the one or more processors, an image representation of the categorical input feature, wherein: (i) the image representation comprises a plurality of image channel representations each associated with a character pattern position of the plurality of character pattern positions, (ii) each image channel representation comprises a plurality of image channel representation regions, (iii) each image channel representation region for an image channel representation corresponds to a candidate character pattern for the character pattern position that is associated with the image channel representation region, and (iv) generating an image channel representation that is associated with a character pattern position is determined based at least in part on the character pattern that is associated with the character pattern position for the image channel representation; generating, using the one or more processors, the image-based prediction based at least in part on the image representation; and performing, using the one or more processors, one or more prediction-based actions based at least in part on the image-based prediction.

In accordance with another aspect, an apparatus comprising at least one processor and at least one memory including program code, the at least one memory and the program code configured to, with the processor, cause the apparatus to at least: receive the categorical input feature, wherein the categorical input feature comprises a plurality of character patterns for a plurality of character pattern positions, wherein each character pattern position is associated with a plurality of candidate character patterns; generate an image representation of the categorical input feature, wherein: (i) the image representation comprises a plurality of image channel representations each associated with a character pattern position of the plurality of character pattern positions, (ii) each image channel representation comprises a plurality of image channel representation regions, (iii) each image channel representation region for an image channel representation corresponds to a candidate character pattern for the character pattern position that is associated with the image channel representation region, and (iv) generating an image channel representation that is associated with a character pattern position is determined based at least in part on the character pattern that is associated with the character pattern position for the image channel representation; generate the image-based prediction based at least in part on the image representation; and perform one or more prediction-based actions based at least in part on the image-based prediction.

In accordance with yet another aspect, a computer program product computer program comprising at least one non-transitory computer-readable storage medium having computer-readable program code portions stored therein, the computer-readable program code portions configured to: receive the categorical input feature, wherein the categorical input feature comprises a plurality of character patterns for a plurality of character pattern positions, wherein each character pattern position is associated with a plurality of candidate character patterns; generate an image representation of the categorical input feature, wherein: (i) the image representation comprises a plurality of image channel representations each associated with a character pattern position of the plurality of character pattern positions, (ii) each image channel representation comprises a plurality of image channel representation regions, (iii) each image channel representation region for an image channel representation corresponds to a candidate character pattern for the character pattern position that is associated with the image channel representation region, and (iv) generating an image channel representation that is associated with a character pattern position is determined based at least in part on the character pattern that is associated with the character pattern position for the image channel representation; generate the image-based prediction based at least in part on the image representation; and perform one or more prediction-based actions based at least in part on the image-based prediction.

BRIEF DESCRIPTION OF THE DRAWINGS

Figure 1:
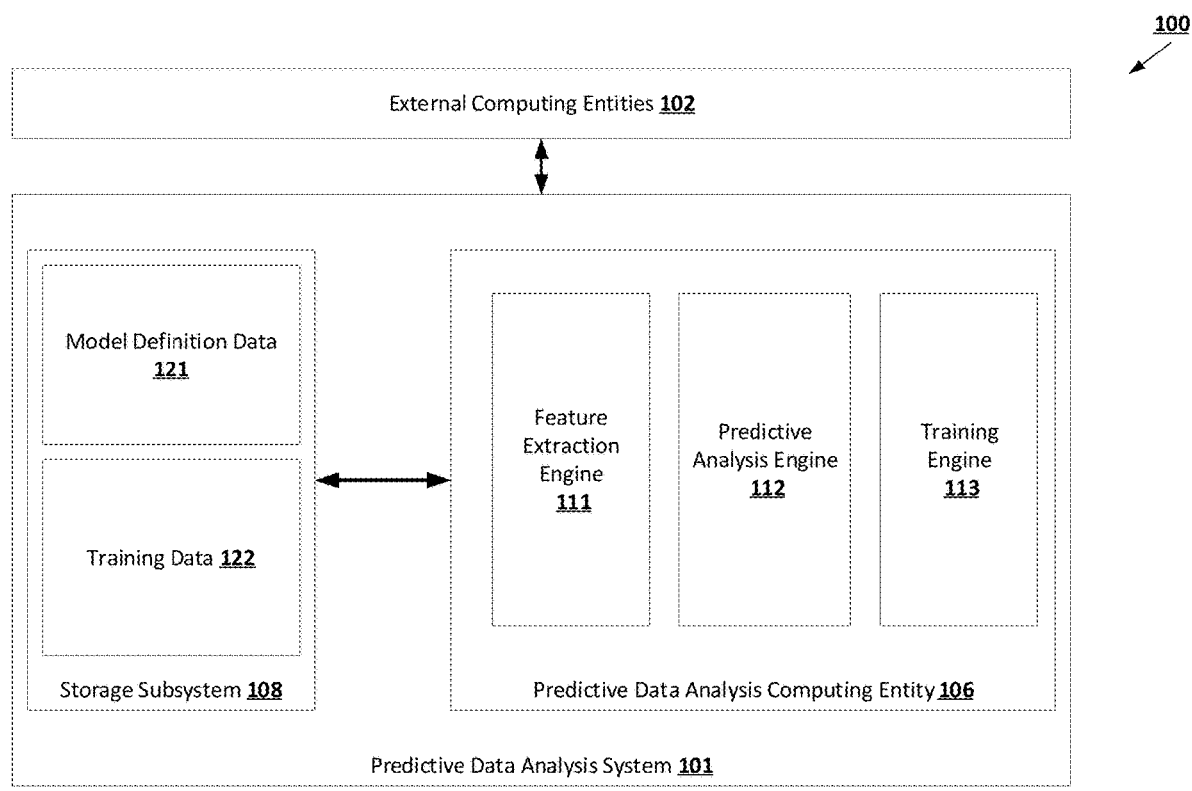
Figure 2:
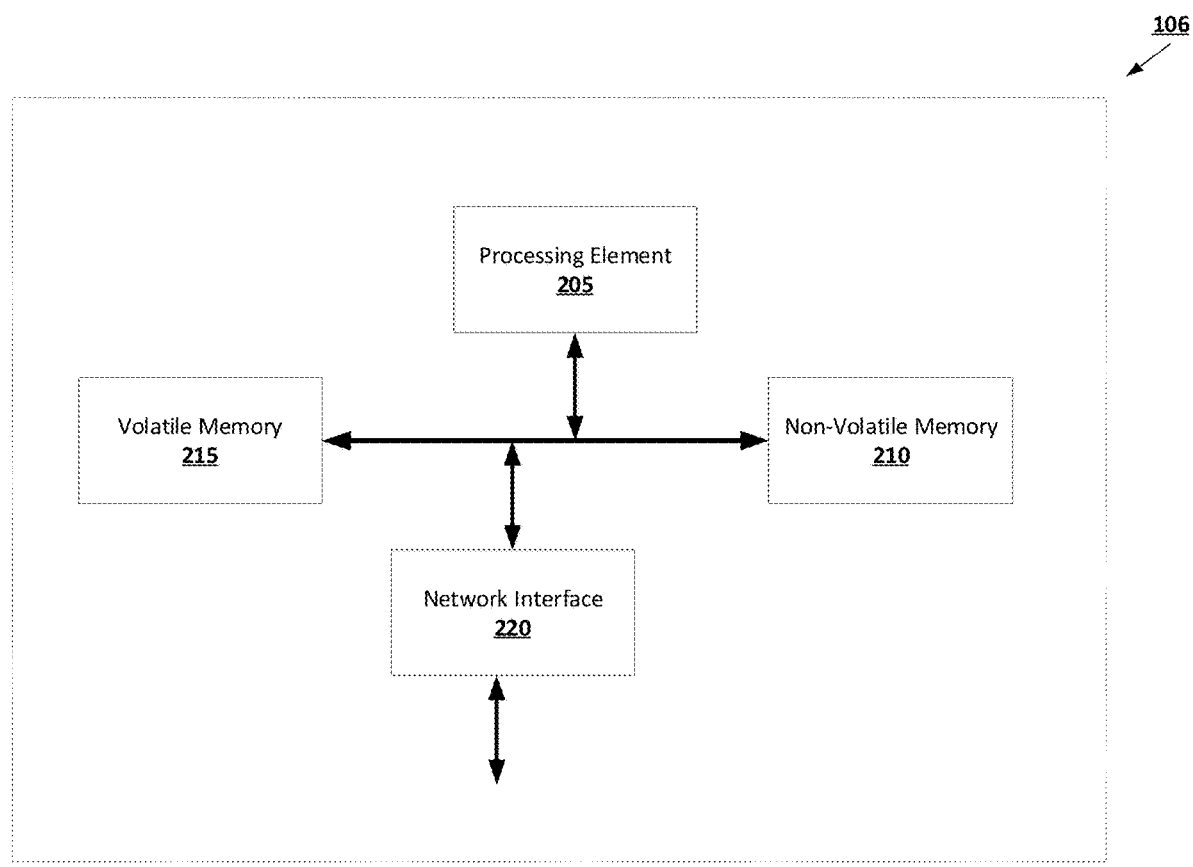
Figure 3:
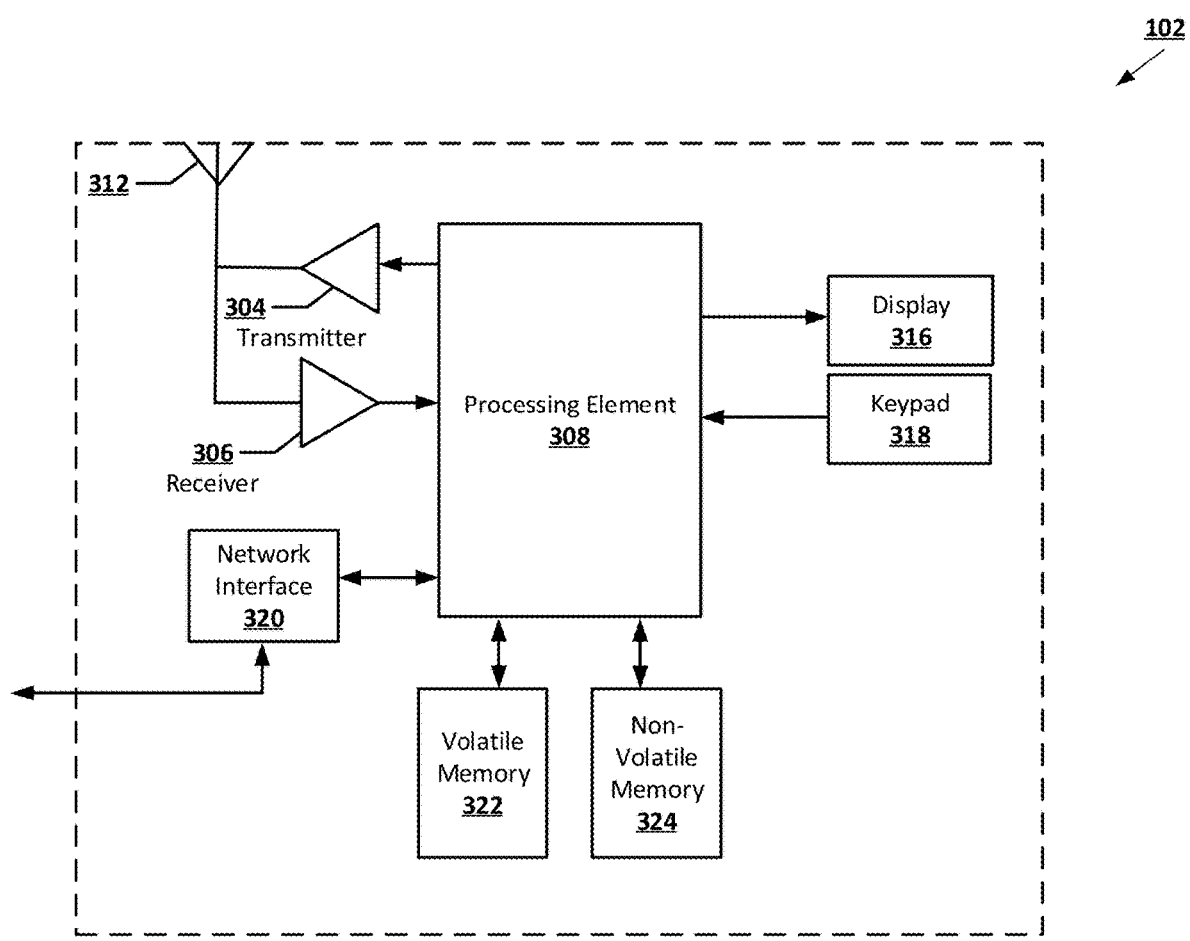
Figure 4:
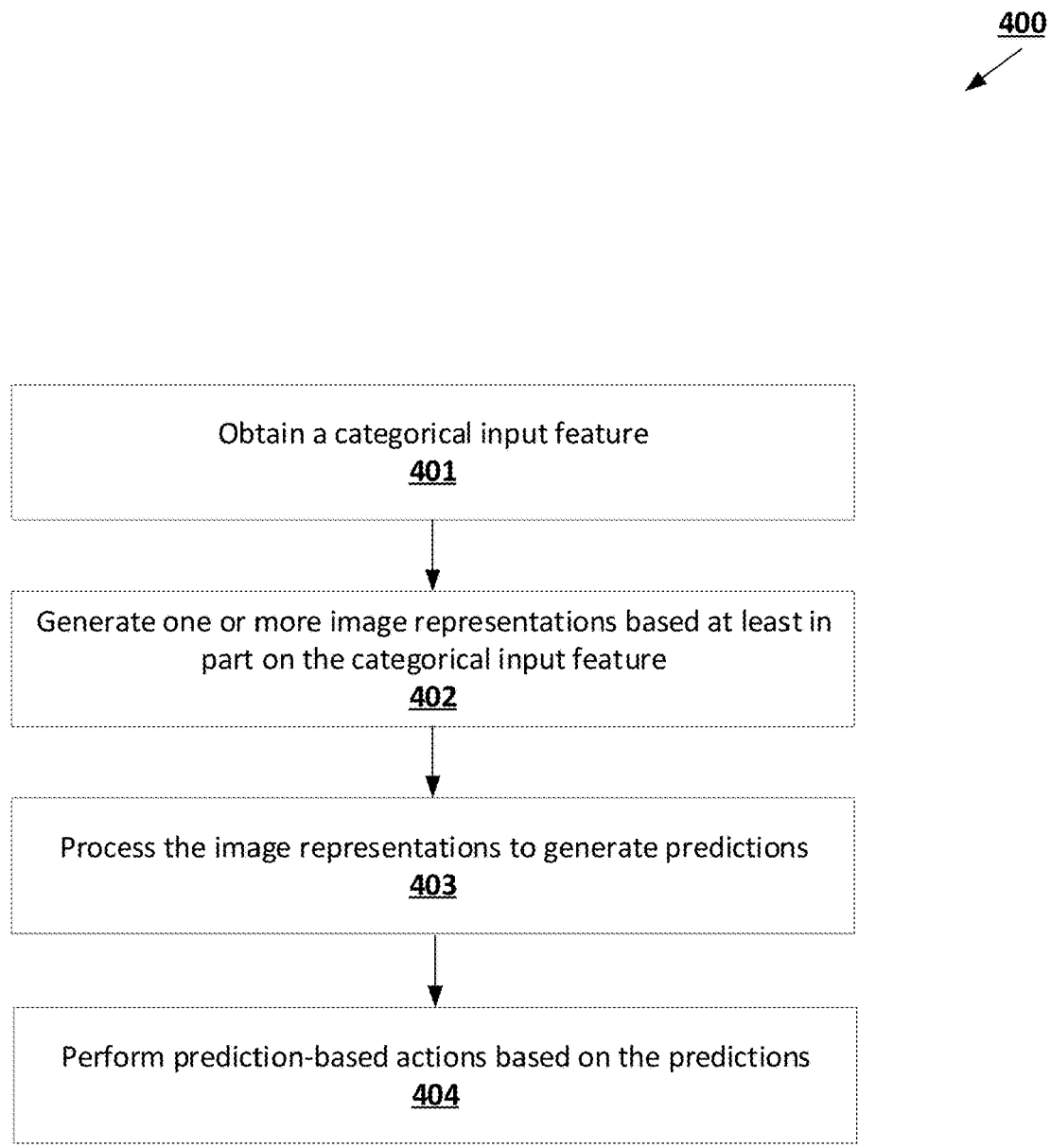
Figure 5:
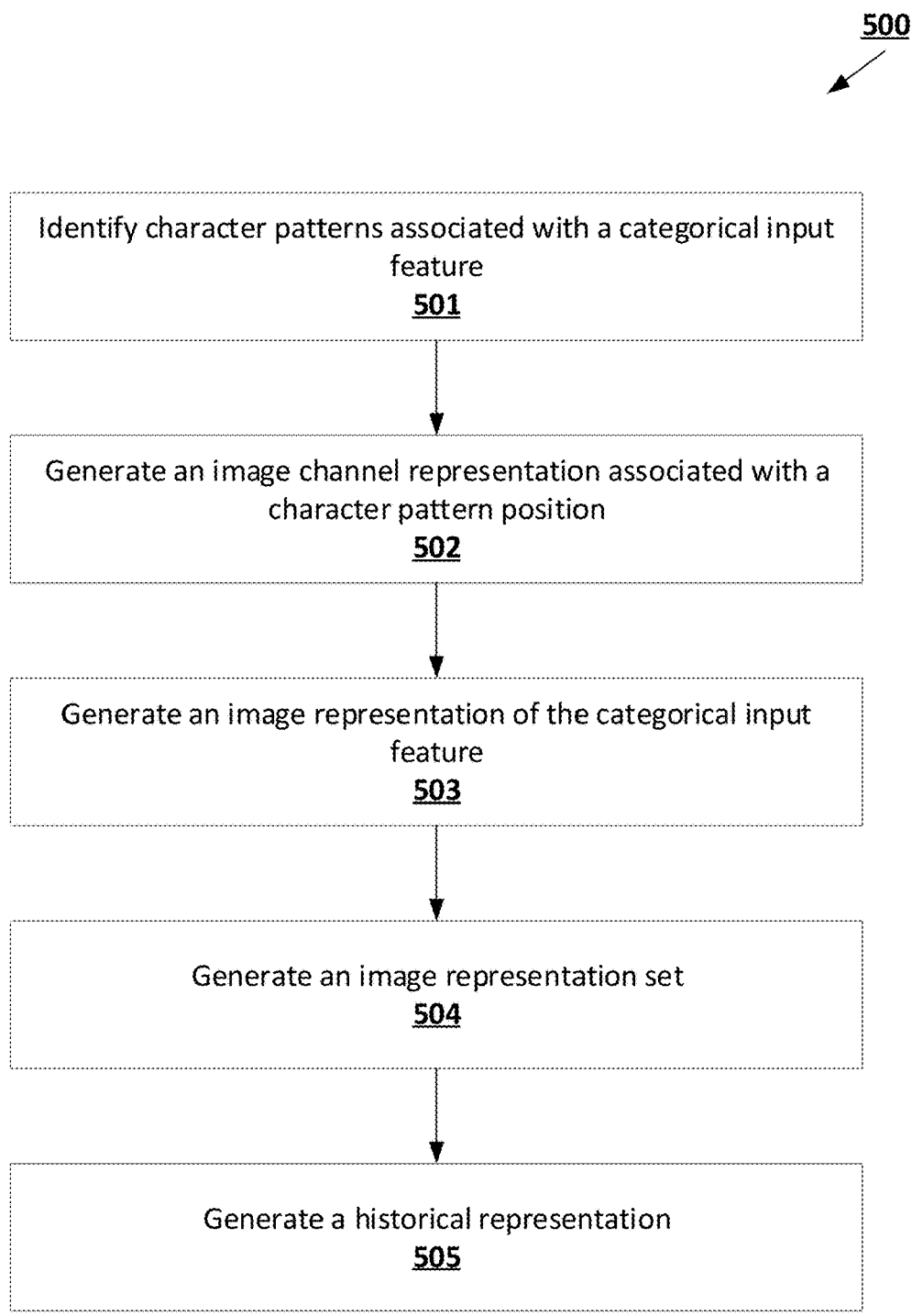
Figure 6:
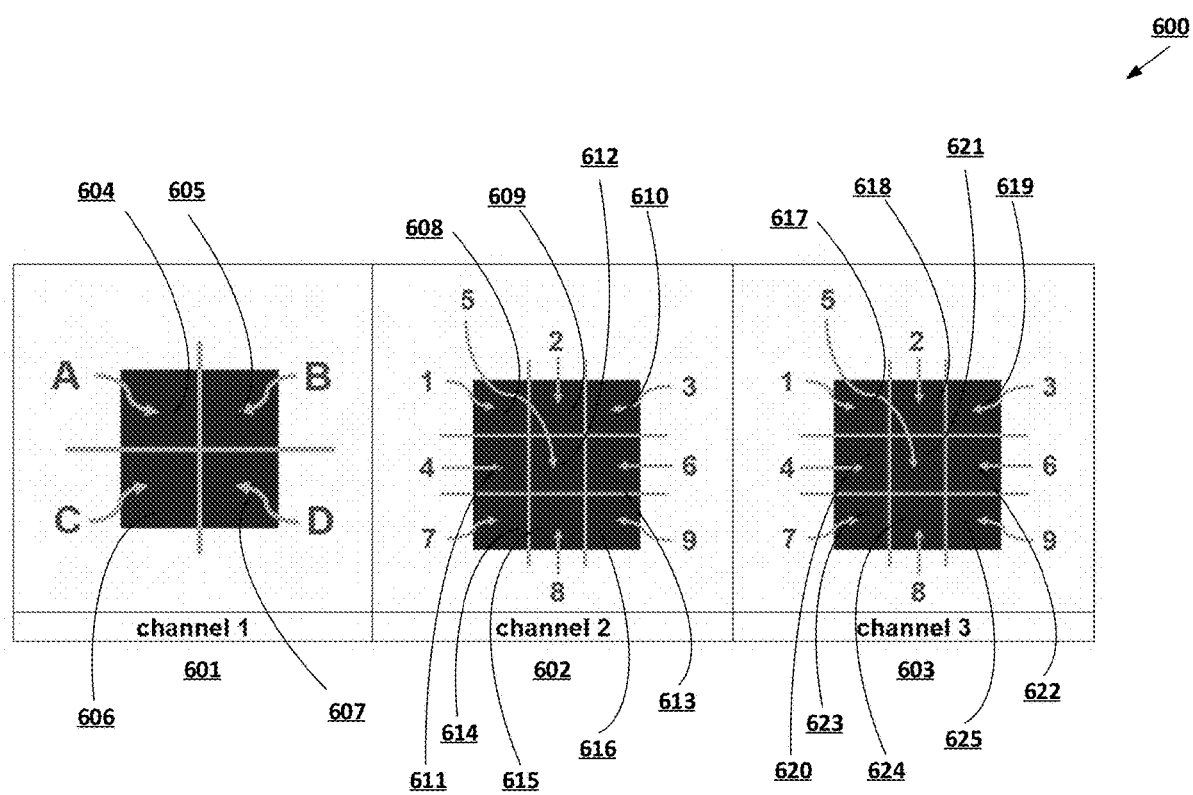
Figure 7:
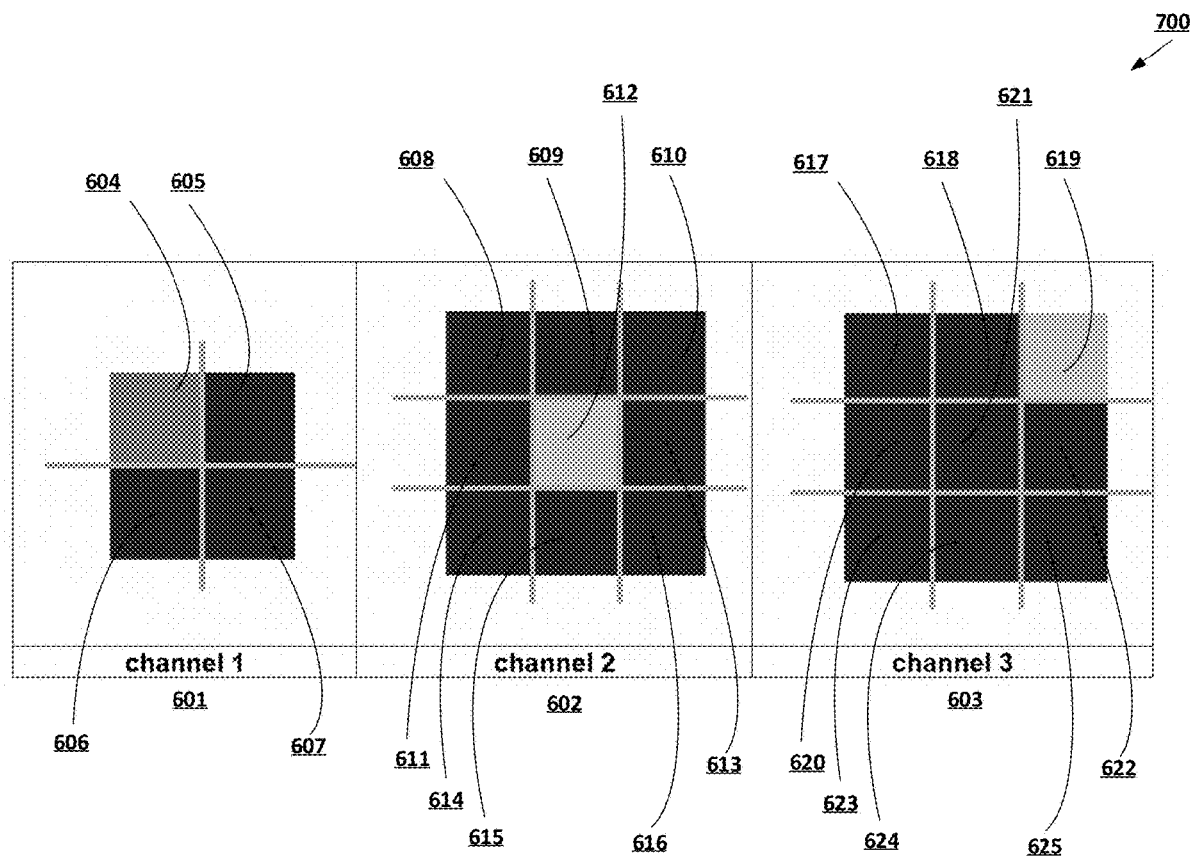
Figure 8:
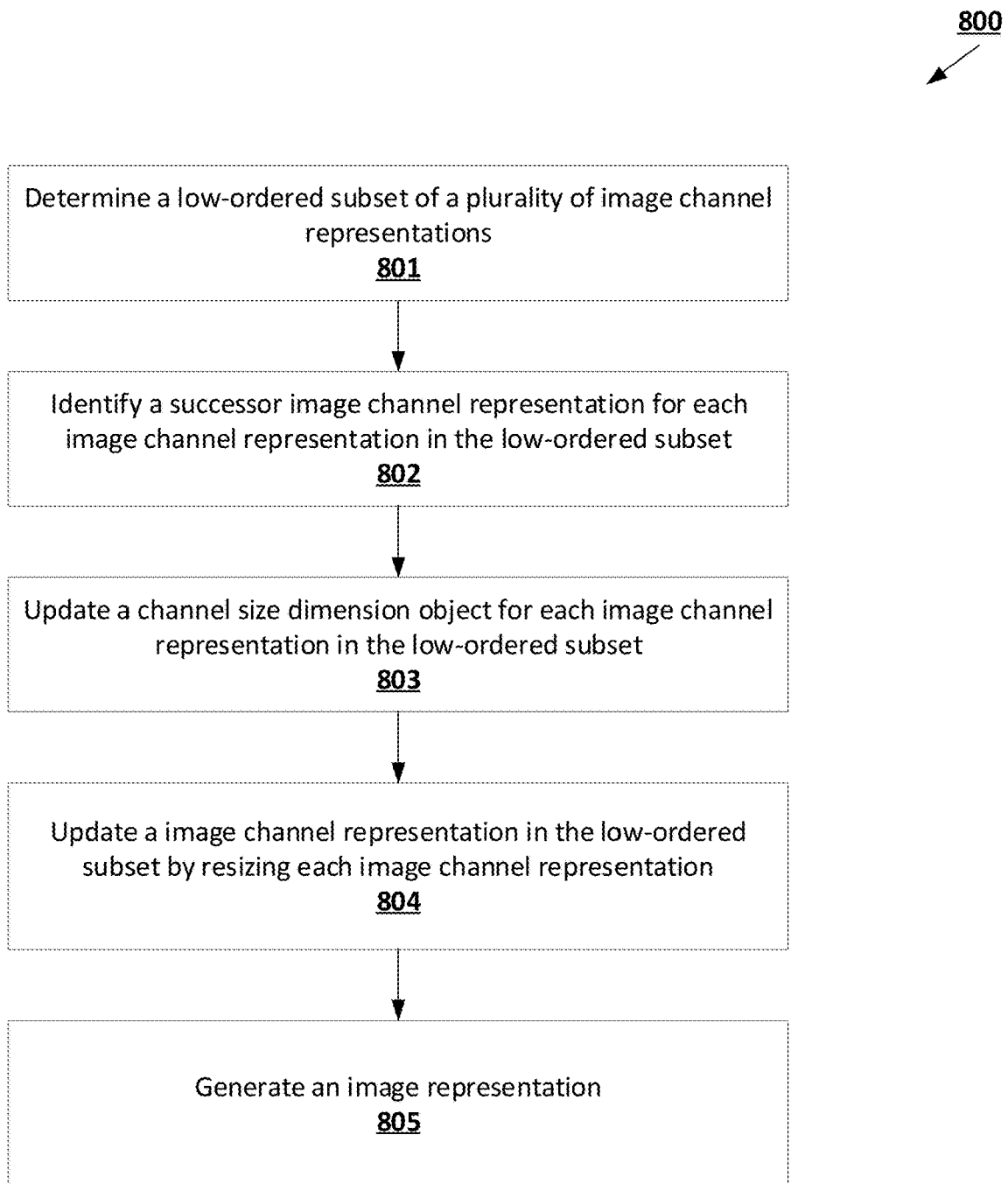
Figure 9A:
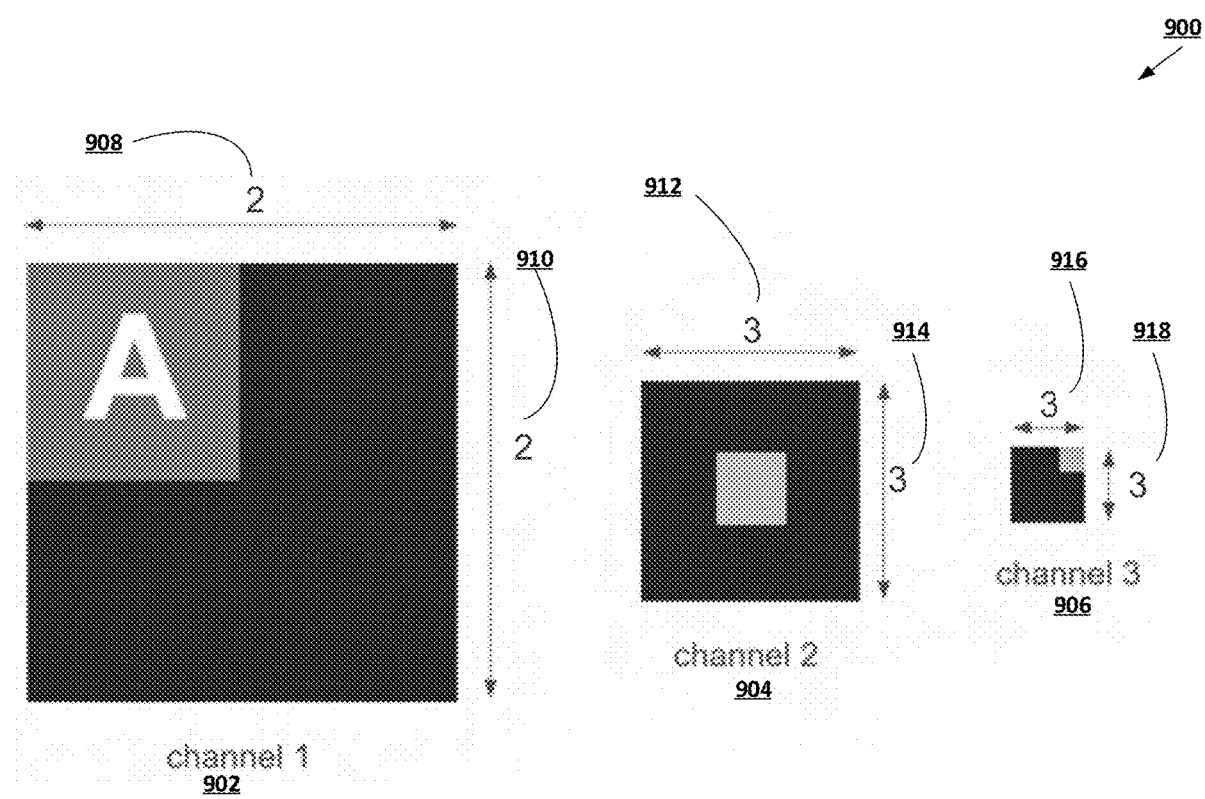
Figure 9B:
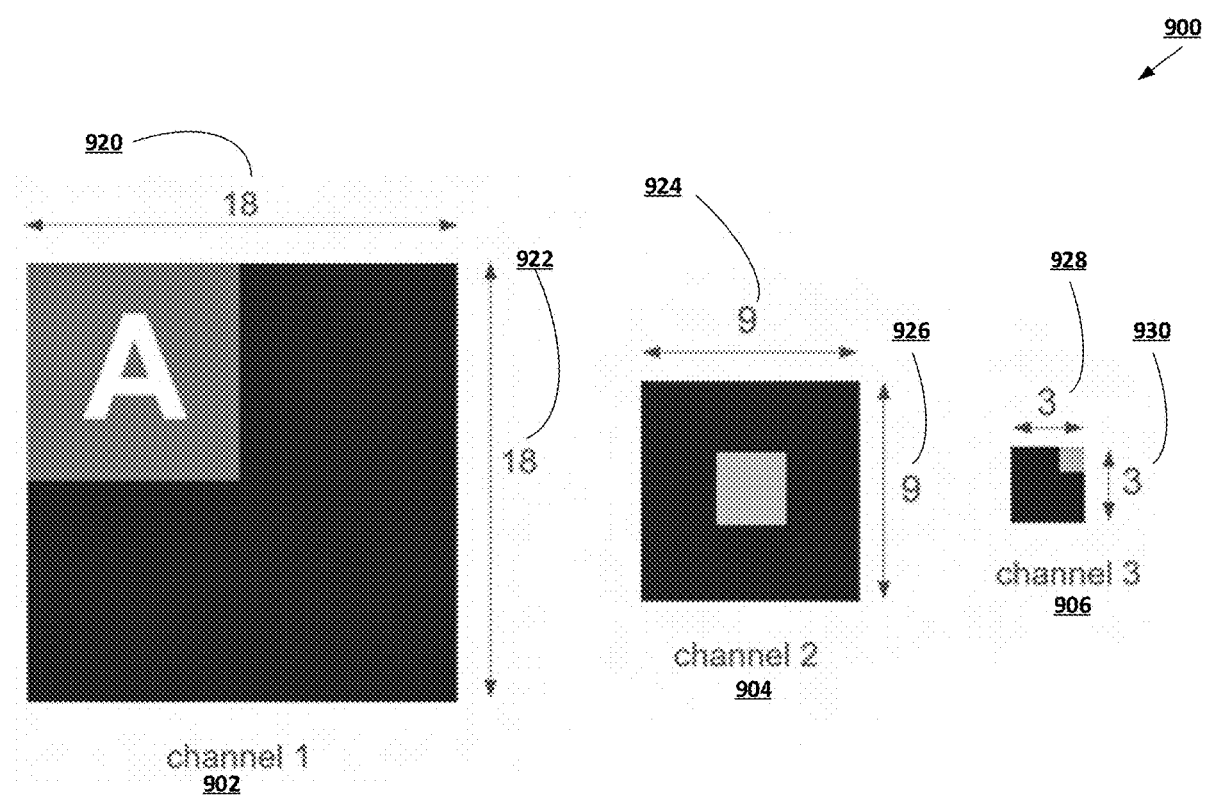
Figure 10:
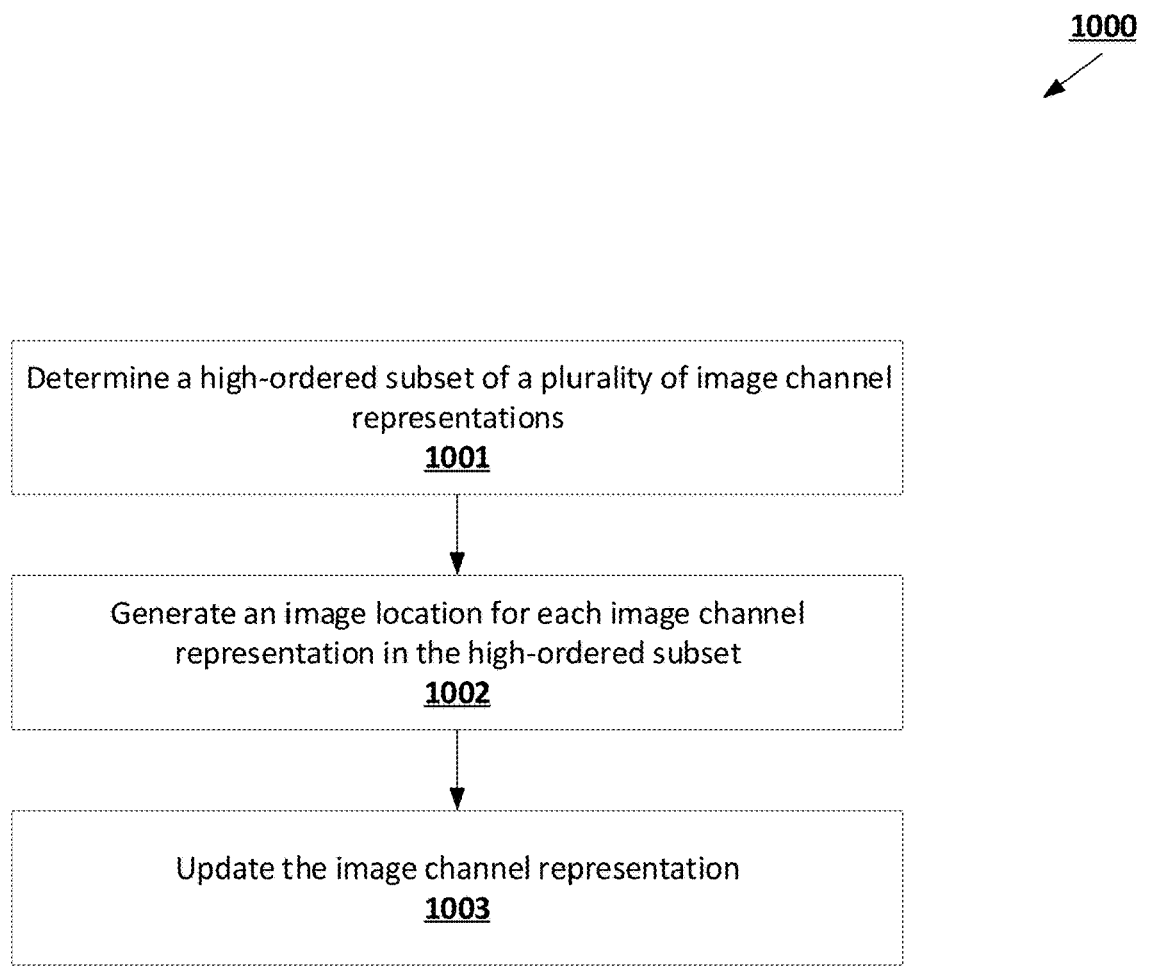
Figure 11:
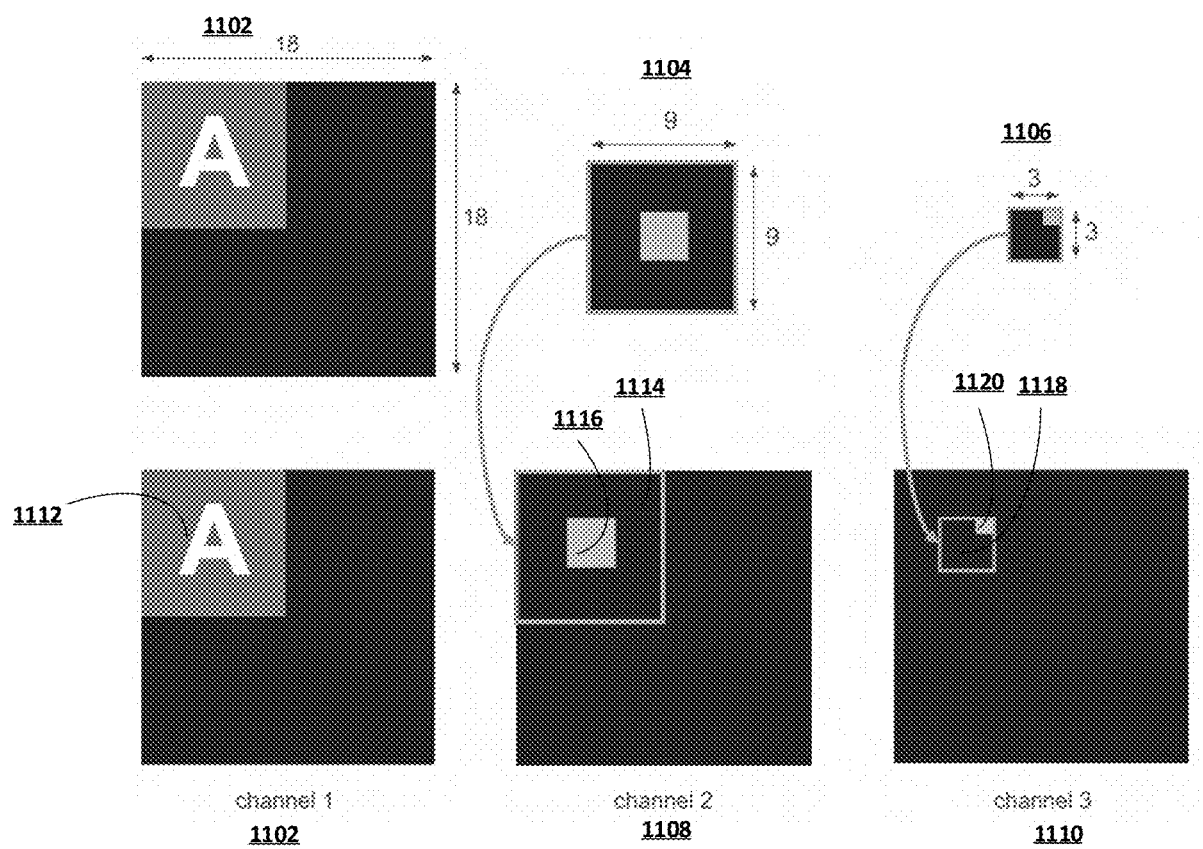
Figure 12:
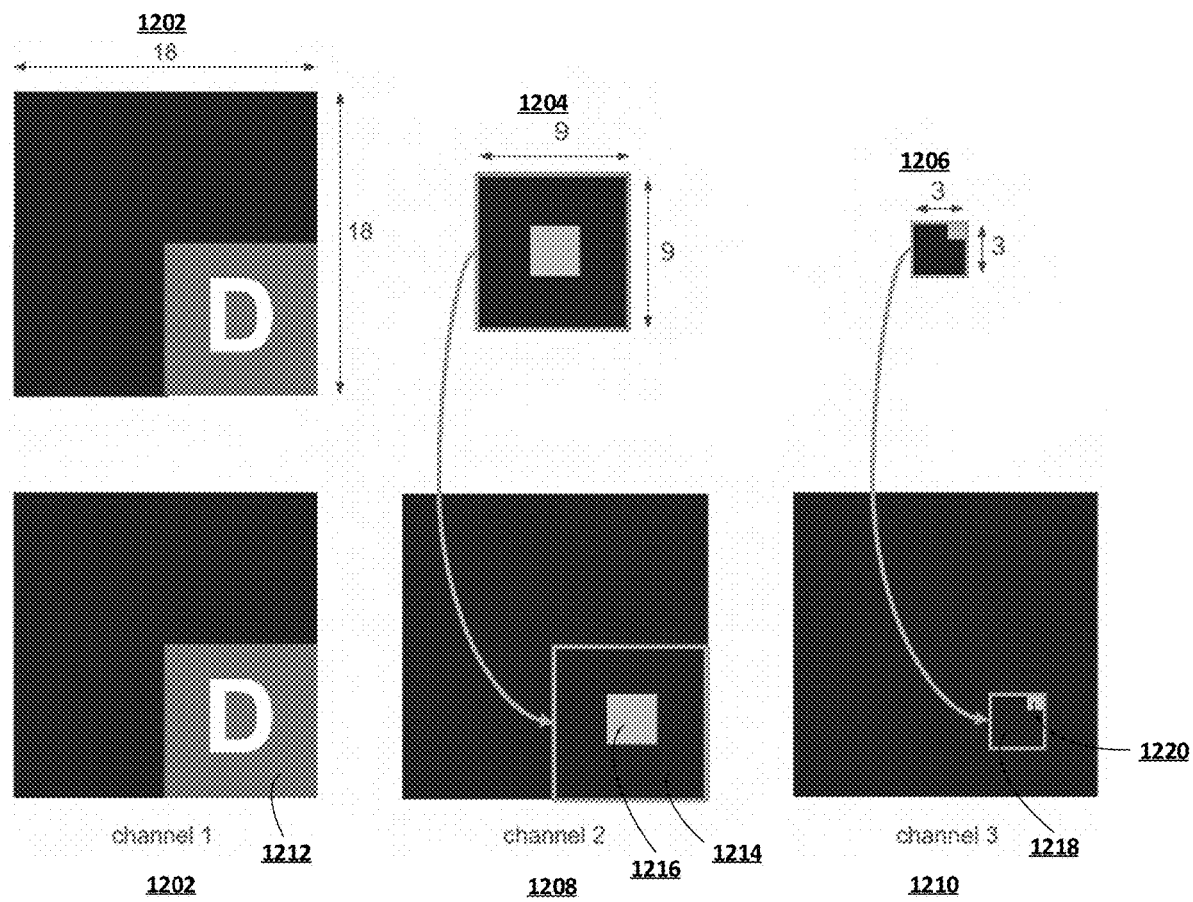
Figure 13:
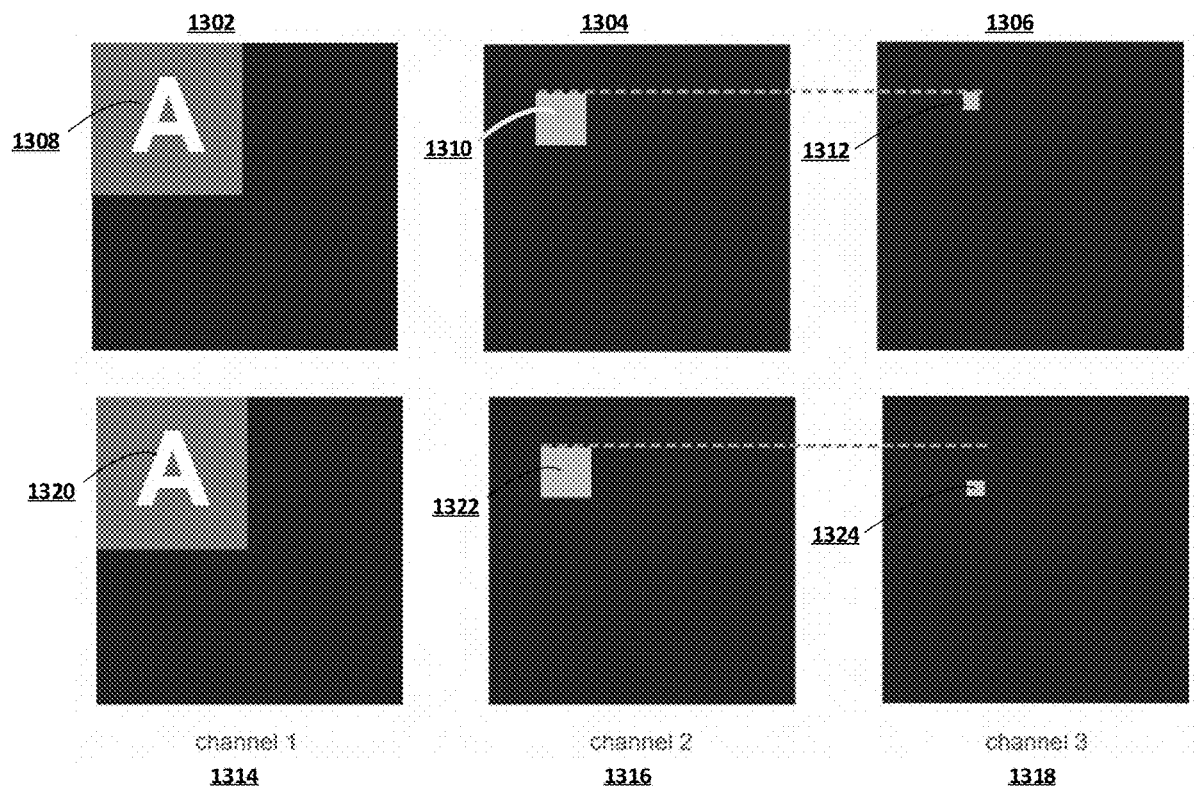
Figure 14:
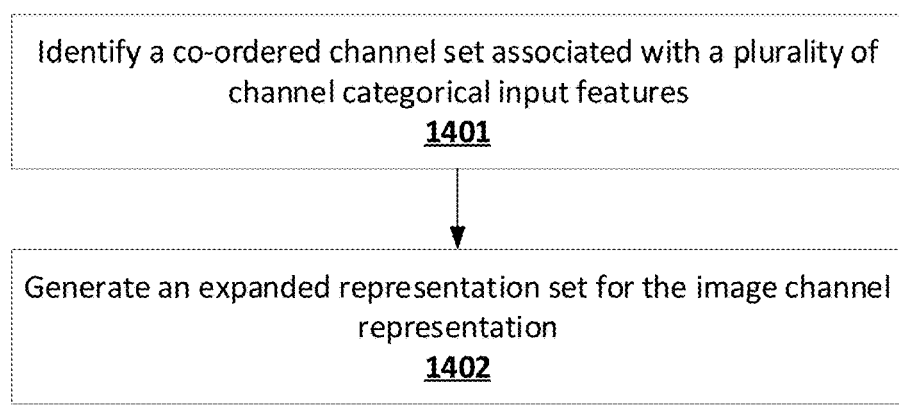
Figure 15:
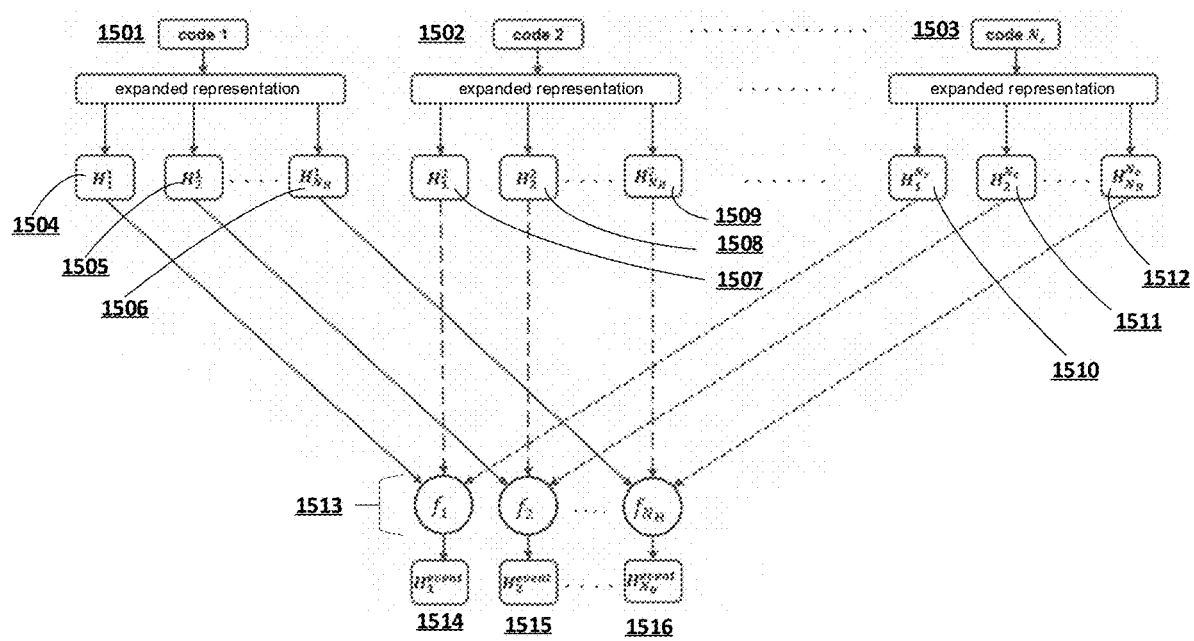
Figure 16:
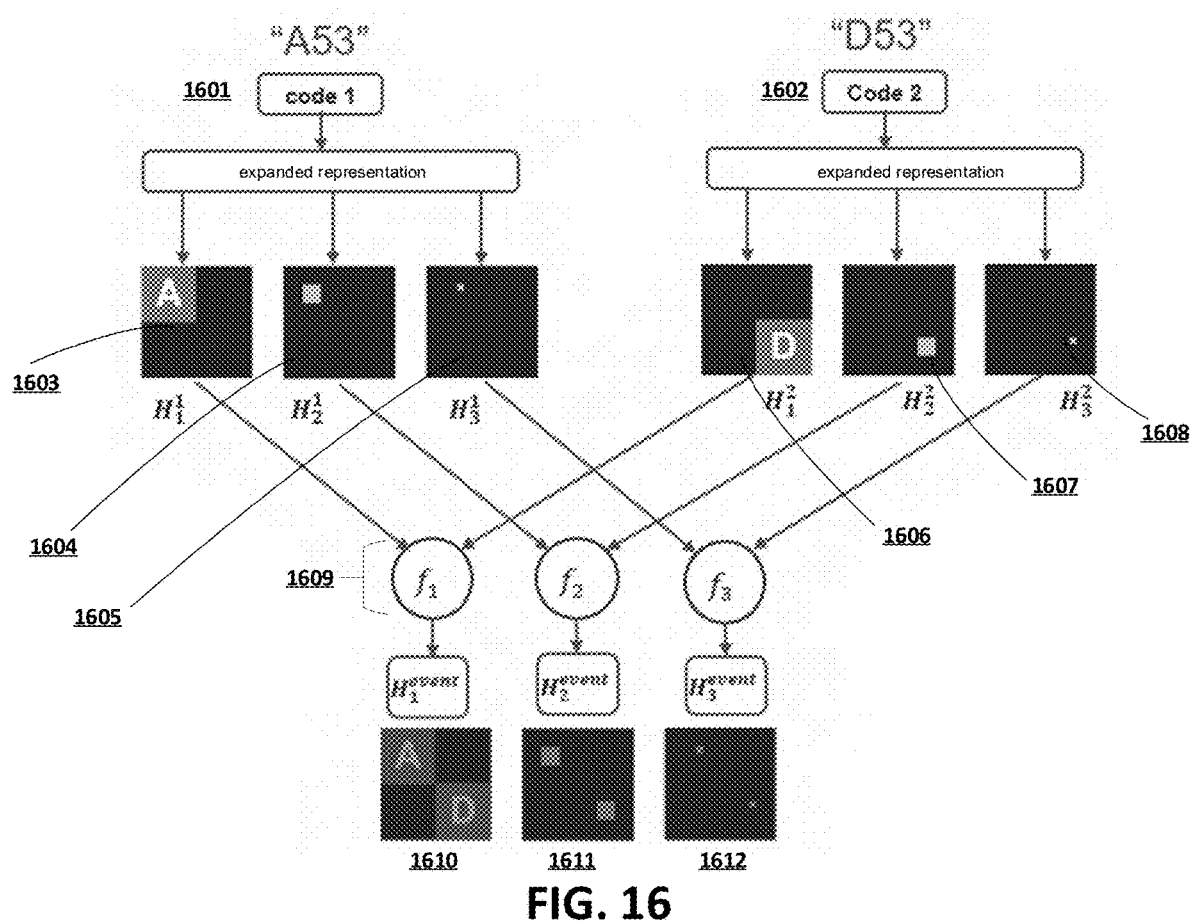
Figure 17:
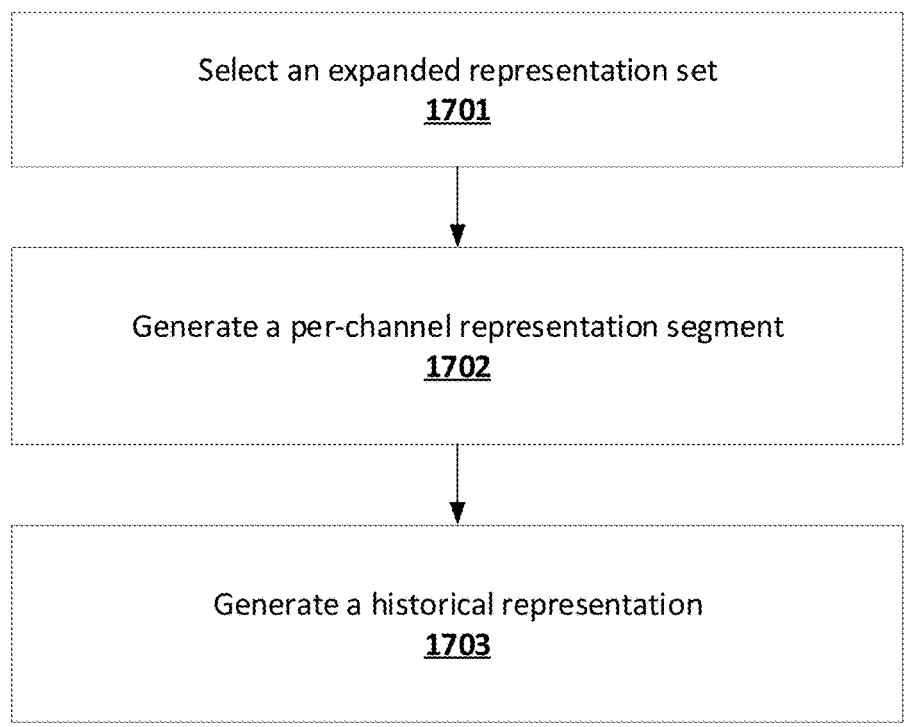
Figure 18:
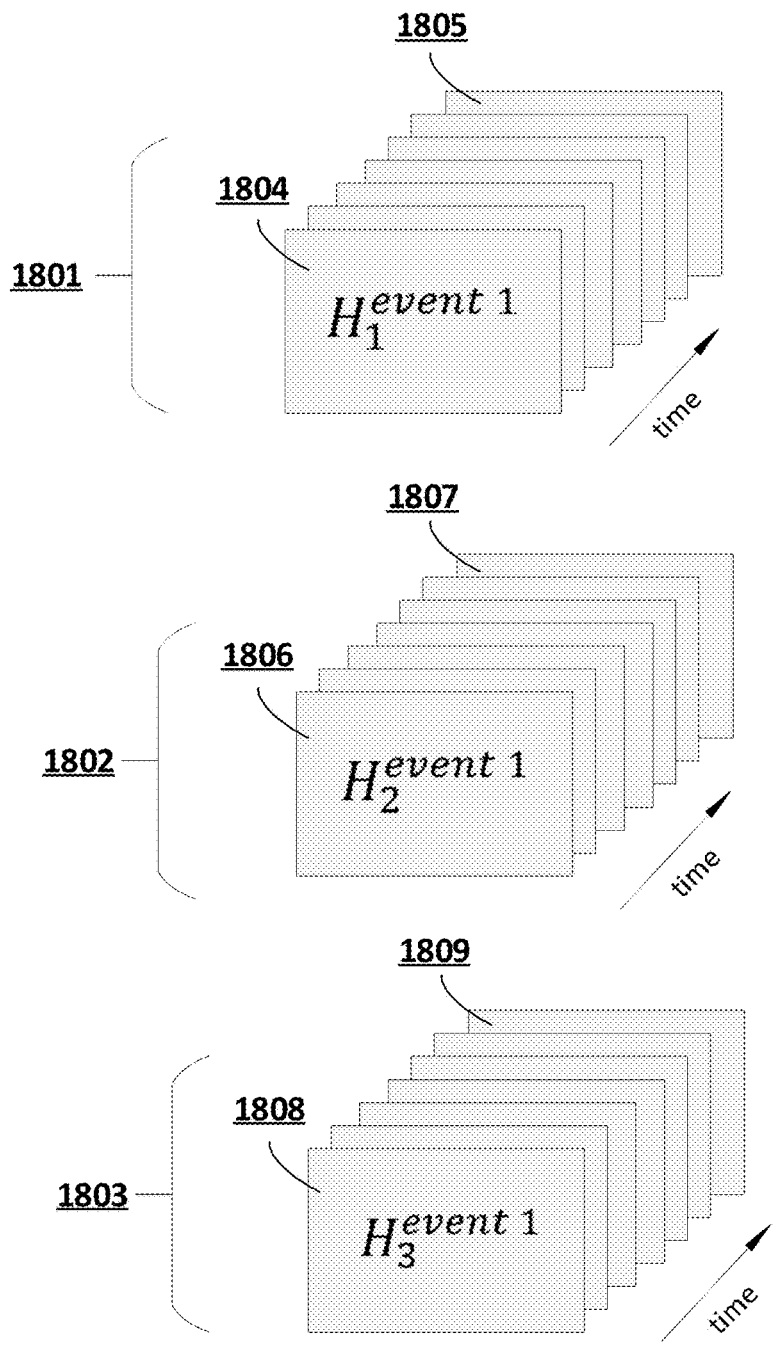
Figure 20:
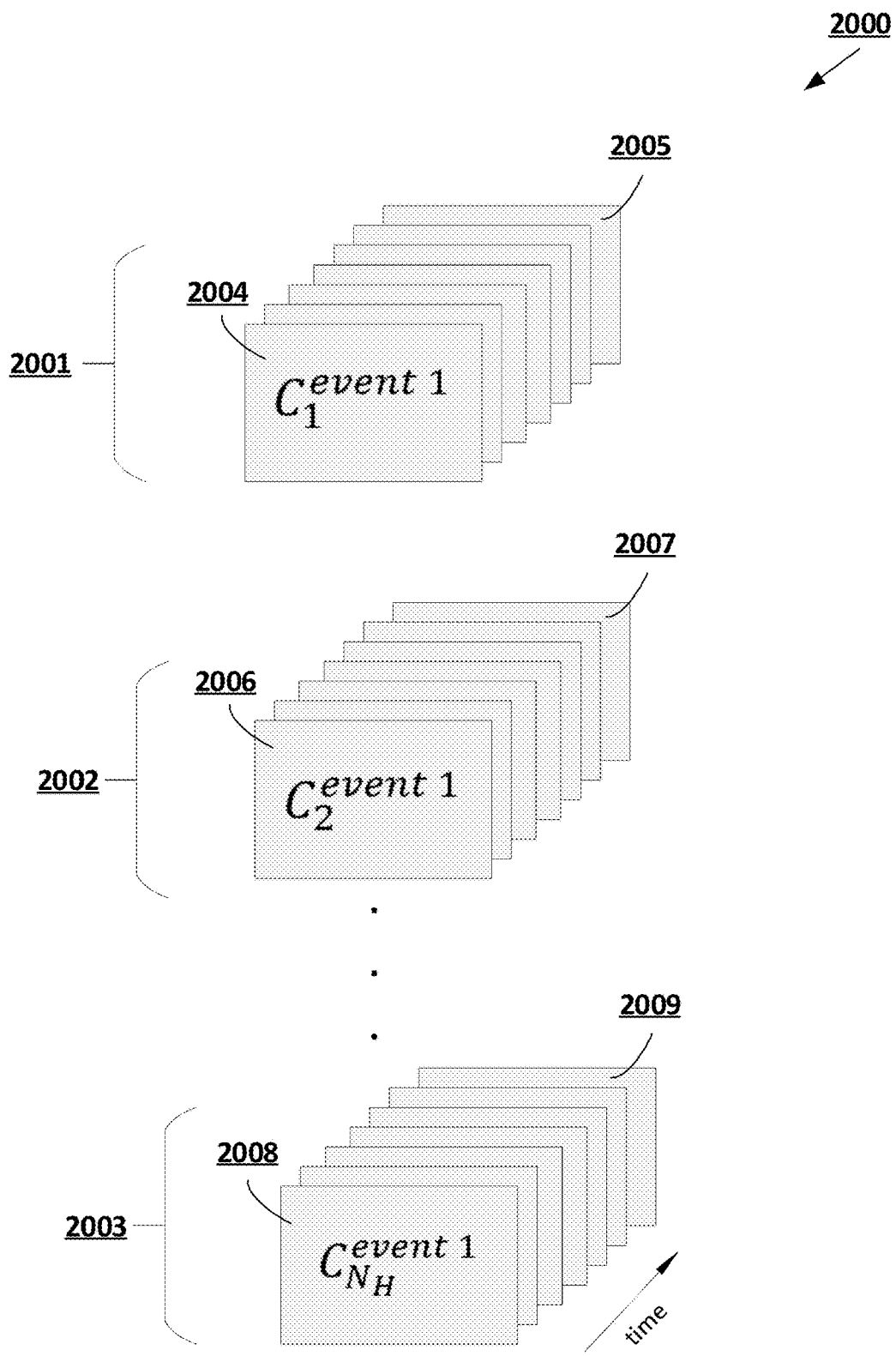
Figure 21:
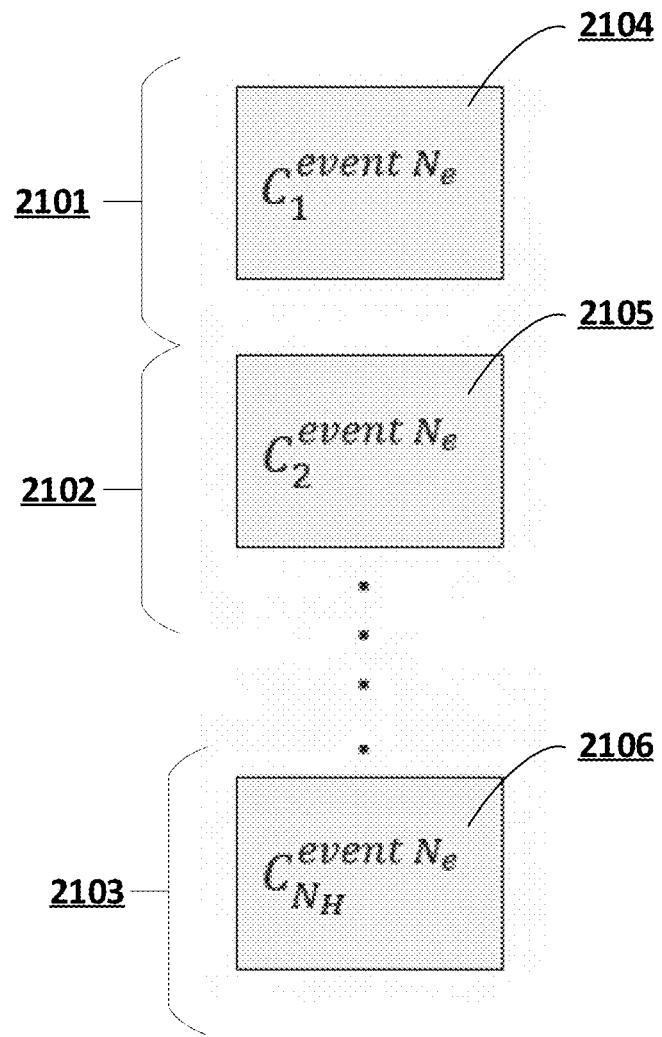
Figure 23:
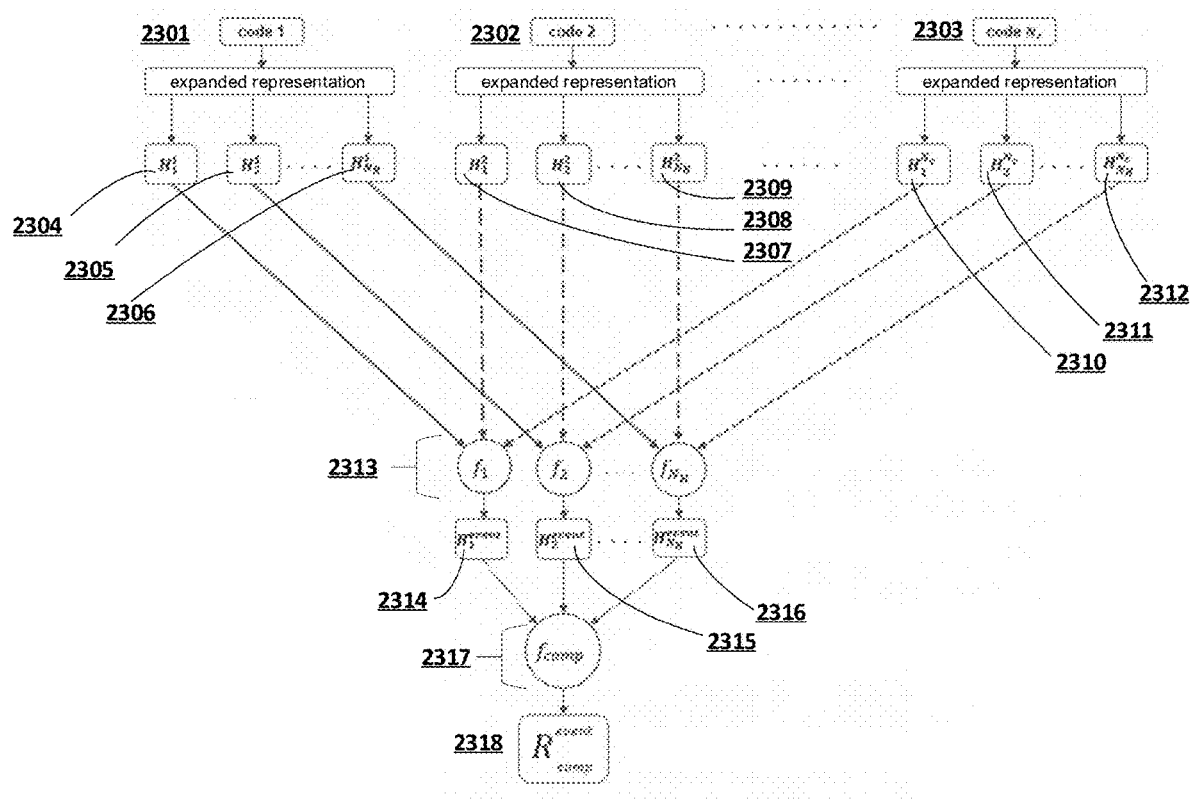
Figure 24A:
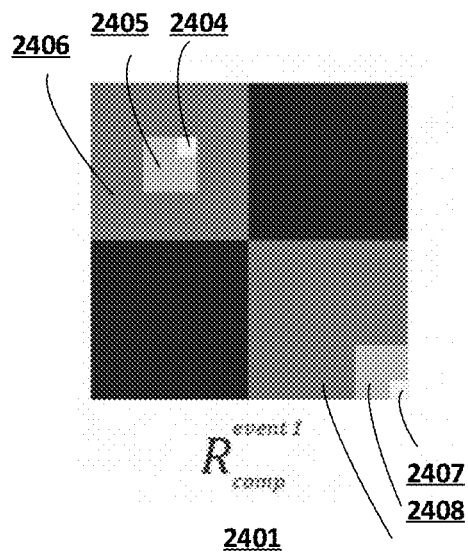
Figure 26:
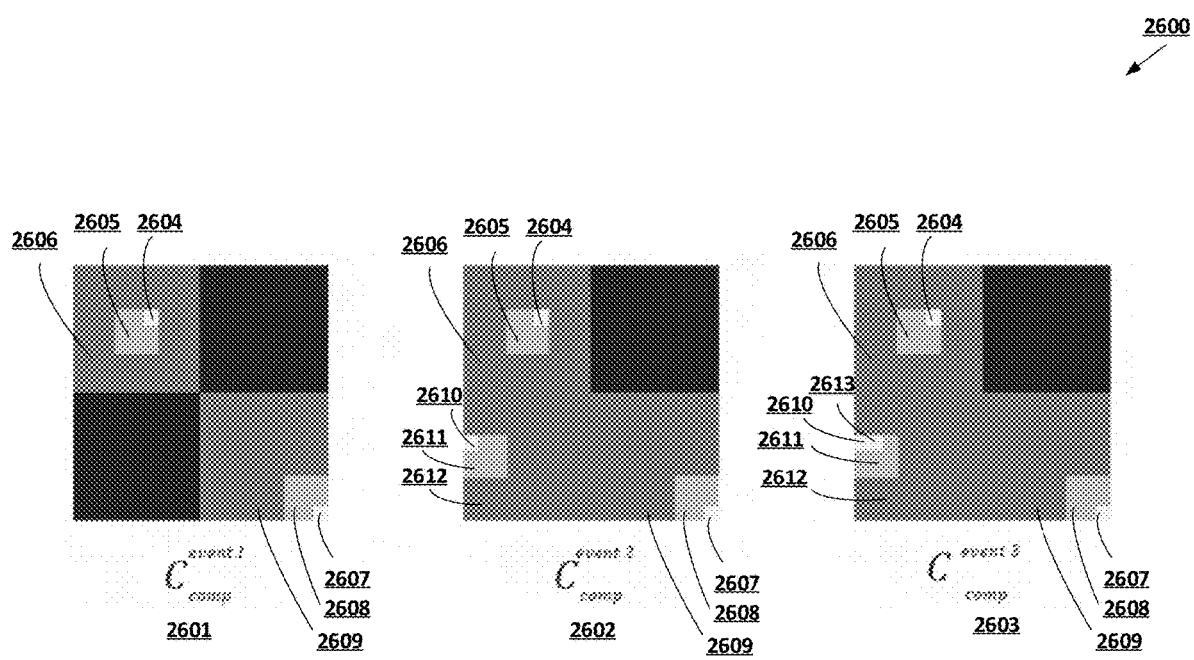
Figure 28:
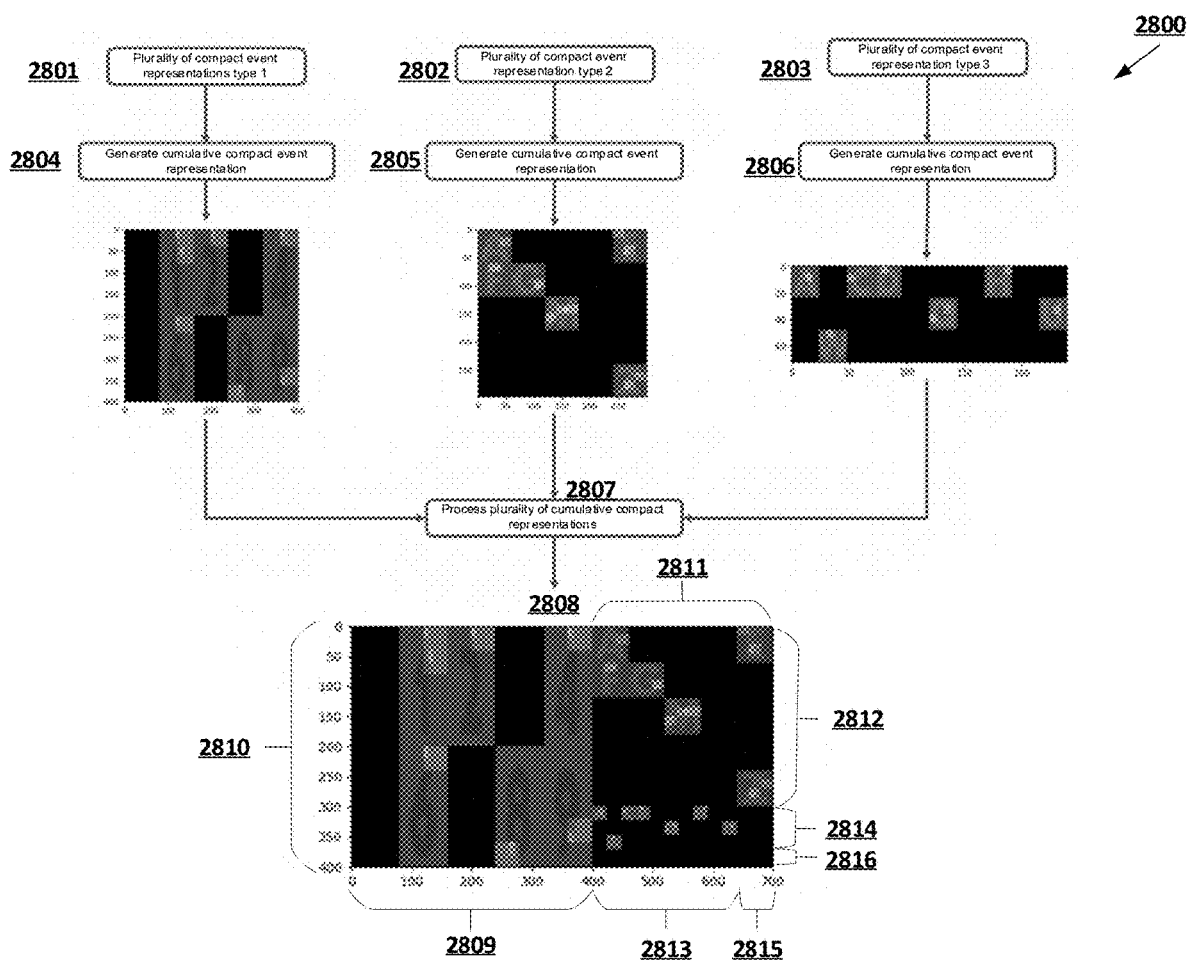
Figure 29:
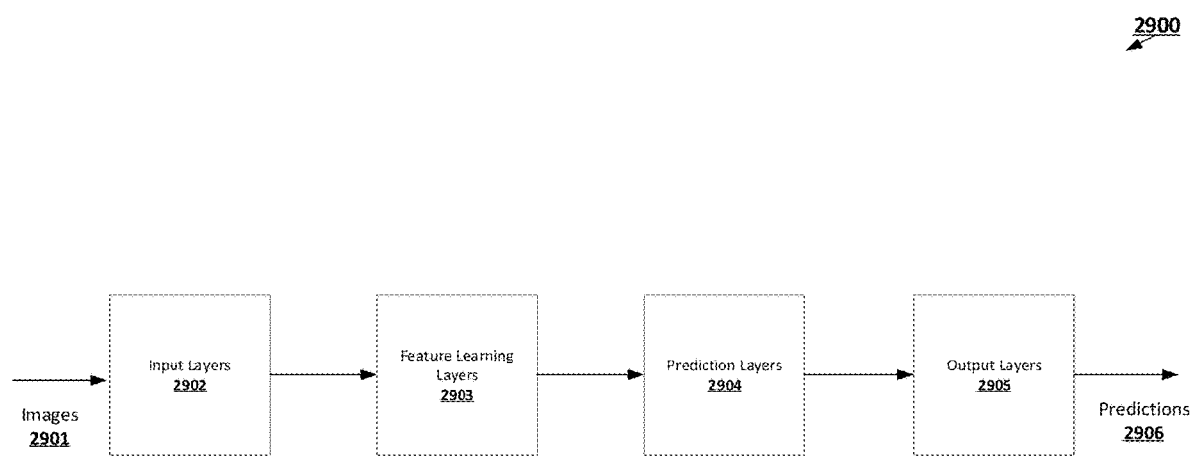
Figure 30:
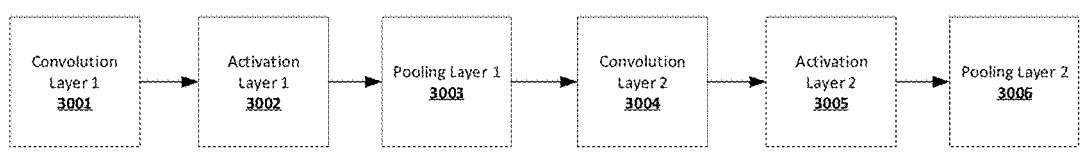
Figure 31:
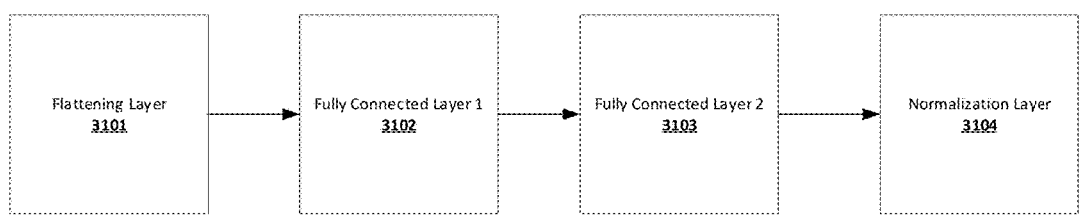
Figure 32:
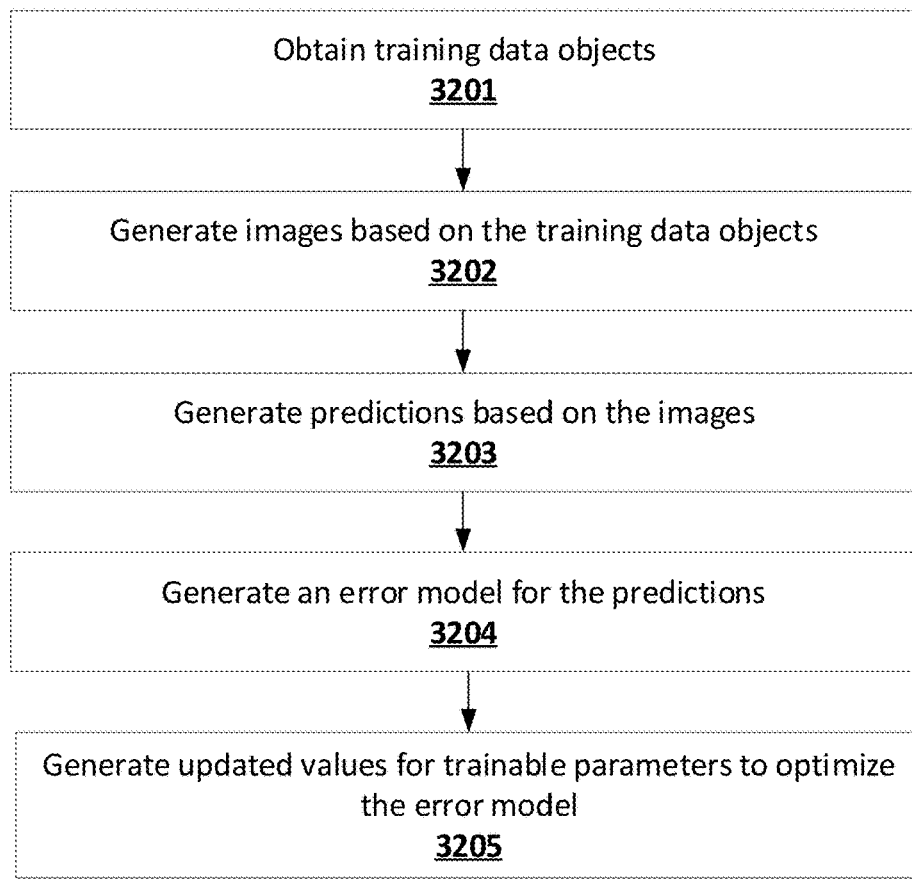

Having thus described the invention in general terms, reference will now be made to the accompanying drawings, which are not necessarily drawn to scale, and wherein:

FIG. 1 provides an exemplary overview of an architecture that can be used to practice embodiments of the present invention;

FIG. 2 provides an example predictive data analysis computing entity in accordance with some embodiments discussed herein;

FIG. 3 provides an example external computing entity in accordance with some embodiments discussed herein;

FIG. 4 is a flowchart diagram of an example process for performing image-based predictive data analysis in accordance with some embodiments discussed herein;

FIG. 5 is a flowchart diagram of an example process for generating an image representation for an image channel in accordance with some embodiments discussed herein;

FIG. 6 provides an operational example of generating image representation channels in accordance with some embodiments discussed herein;

FIG. 7 provides an operational example of image representation for each image representation channel in accordance with some embodiments discussed herein;

FIG. 8 is a flowchart diagram of an example process for resizing an image channel in accordance with some embodiments discussed herein;

FIGS. 9A-B provide operational examples of resizing an image in accordance with some embodiments discussed herein;

FIG. 10 is a flowchart diagram of an example process for updating an image channel in accordance with some embodiments discussed herein;

FIGS. 11-13 provide operational examples of image representations after resizing in accordance with some embodiments discussed herein;

FIG. 14 is a flowchart diagram of an example process for generating an expanded representation set in accordance with some embodiments discussed herein;

FIGS. 15-16 provide operational examples of expanded representation sets in accordance with some embodiments discussed herein;

FIG. 17 is a flowchart diagram of an example process for generating a historical representation of an expanded representation set in accordance with some embodiments discussed herein;

FIG. 18 provides an operational example of historical representation of an expanded representation set in accordance with some embodiments discussed herein;

FIG. 19 is a flowchart diagram of an example process for generating a cumulative expanded representation in accordance with some embodiments discussed herein;

FIGS. 20-21 provide operational examples of cumulative expanded representations in accordance with some embodiments discussed herein;

FIG. 22 is a flowchart diagram of an example process for generating a compact event representation in accordance with some embodiments discussed herein;

FIGS. 23-24A-C provide operational examples of compact event representation in accordance with some embodiments discussed herein;

FIG. 25 is a flowchart diagram of an example process for generating a cumulative compact event representation in accordance with some embodiments discussed herein;

FIG. 26 provides an operational example of a cumulative compact event representation in accordance with some embodiments discussed herein;

FIG. 27 is a flowchart diagram of an example process for generating a cumulative compact event representation for a plurality of categorical input features associated with different types of structure text input features in accordance with some embodiments discussed herein;

FIG. 28 provides an operational example of a cumulative compact event representation for a plurality of categorical input features associated with different types of structure text input features in accordance with some embodiments discussed herein;

FIG. 29 is a block diagram of an example convolutional neural network architecture in accordance with some embodiments discussed herein;

FIG. 30 is a block diagram of an example convolutional layer set architecture for a convolutional neural network in accordance with some embodiments discussed herein;

FIG. 31 is a block diagram of an example prediction layer set architecture for a convolutional neural network in accordance with some embodiments discussed herein; and FIG. 32 is a flowchart diagram of an example process for training a machine learning model for performing image-based predictive data analysis in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Discussed herein methods, apparatus, systems, computing devices, computing entities, and/or the like for predictive data analysis of categorical data by generating image representations of the categorical data. As will be recognized, however, the disclosed concepts can be used to perform any type of data analysis, including non-predictive data analysis. Examples of predictive data analysis include supervised machine learning analysis (e.g., classification analysis and regression analysis) and unsupervised machine learning analysis (e.g., clustering analysis). Any embodiments of the present invention described herein with reference to categorical data should be understood to refer to categorical data.

Many existing predictive data analysis solutions are incapable of efficiently and reliably performing predictive data analysis in prediction domains with complex input spaces. This is because many existing predictive data analysis solutions are developed for more common predictive data analysis tasks like image classification. For example, in the image classification domain, convolution neural networks (CNNs) have achieved tremendous success in efficiently and accurately performing predictive data analysis. Such solutions, however, are largely out of reach of developers in prediction domains with more complex input structures, such as prediction domains with high-dimensional categorical feature spaces, prediction domains with highly sparse data, and/or prediction domains with high cardinality data. Thus, there is a technical need for predictive data analysis solutions that are capable of efficiently and reliably performing predictive data analysis in prediction domains with complex input spaces.

Additionally, difficulties with existing predictive data analysis solutions are further exacerbated by the inability to communicate temporal information within existing complex input structures. For example, in the image classification domain, the input structure may be configured in a variety of ways but nevertheless lacks communication of any associated temporal aspect. In some instances, such as detecting or monitoring a patient's disease progression, it may be beneficial to communicate such temporal aspects to detect patterns within a plurality of input structures to determine how such patterns evolve over time.

Various embodiments of the present invention address technical challenges related to efficiently and reliably performing predictive data analysis in prediction domains. For example, in some embodiments, proposed solutions disclose generating an image representation of one or more categorical input features comprising a plurality of character patterns for a plurality of character positions. The image representation may comprise a plurality of image representation channels for each character position and each image representation channel may comprise a plurality of image representation channel regions corresponding to a candidate character pattern for the particular character position. The image representations may be further processed to generate an expanded representation, cumulative expanded representation, historical representation, compact event representation, and cumulative compact event representation representative of a plurality of categorical input features. After generation, the various image representation can be utilized by an image-based machine learning model (e.g., a machine learning model utilizing a CNN) to perform efficient and reliable predictive data analysis. The resulting machine learning solutions are more efficient to train and more reliable when trained. In doing so, various embodiments of the present invention address shortcomings of existing predictive data analysis solutions and enable solutions that are capable of efficiently and reliably performing predictive data analysis in prediction domains with complex input spaces as well as conveying temporal information.

II. Definitions of Certain Terms

The term "event" may refer to may refer to an electronically-maintained data construct that is configured to describe one or more categorical input features pertaining to a recorded event, such as one or more clinical codes associated with a medical visit event by a user. In some embodiments, an event may describe a clinical event. For example, an event may describe a healthcare visit, a diagnosis for a user during a healthcare visit, a pharmaceutical purchase visit, or the like. In some embodiments, each event may be associated with a date data object indicative of when the event occurred.

The term "categorical input feature" may refer to an electronically-maintained data construct that is configured to describe categorical data pertaining to an event. In some embodiments, the categorical input feature may be indicative of a diagnosis code for an event, a procedure code for an event, a pharmacy code for an event, or the like. In some embodiments, the categorical input feature may be an International Classification of Disease (ICD) code, a hierarchical ingredient code (HIC), a Current Procedural Terminology (CPT) code, and/or the like. In some embodiments, a categorical input feature may comprise a plurality of character patterns for a plurality of character pattern positions.

The term "character pattern position" may refer to an electronically managed data construct that is configured to describe a particular set of characters in the categorical input features having a particular categorical input feature type, where the particular set of characters are defined by a position of the particular set of characters within the categorical input features having the particular categorical input feature type. For example, given the categorical input features having an ICD code categorical input feature type, the first character of an ICD code may have a first character pattern position, a second character of an ICD code may have a second character pattern position, and so on. Accordingly, given the ICD code "A53," an associated first character pattern position may comprise the character pattern corresponding to the first digit (i.e., "A"), the second character pattern position may comprise the character pattern corresponding to the second digit (i.e., "5"), and the third character position may comprise the character pattern corresponding to the third digit (i.e., "3"). In some embodiments, each character pattern position for a group of categorical input features having a particular categorical input feature type may be associated with a set of candidate character patterns. For example, for the first character position of an ICD code, the plurality of candidate character patterns may include "A," "B," "C," or "D," while, for each of the second character position and third character positions for an ICD code, the plurality of candidate character patterns may include a number between 1 to 9.

The term "image channel representation" may refer to an electronically managed data construct that is configured to describe, given a corresponding categorical input feature having a plurality of character patterns for a plurality of character pattern positions, a plurality of image channel representation regions corresponding to the plurality of candidate character patterns for a corresponding character pattern position of the plurality of character pattern positions, where an image channel representation region corresponding to the character pattern for the corresponding categorical input feature with respect to the corresponding categorical input feature is visually distinguished. For example, for the categorical input feature "A53," the first character pattern position of the categorical input feature that is associated with the character pattern A may be associated with an image channel representation that is divided into four image channel representation regions (because the first character pattern position is associated with four candidate character patterns may include "A," "B," "C," or "D"), where an image channel representation region corresponding to the candidate character pattern "A" is visually distinguished (e.g., by marking the an image channel representation region corresponding to the candidate character pattern "A" with a particular color. In some embodiments, the plurality of image channel representations may be associated with an image channel order. The image channel order may be determined based at least in part on a character pattern position order of the plurality of character patterns. For example, for an ICD code, the image channel representation corresponding to the first character pattern position of the ICD code may have a lower-ordered position relative to the image channel representation corresponding to the second character position. In some embodiments, each image channel representation may have an associated channel size dimension data object. The channel size data object may be indicative of the number of pixels corresponding to the length and width of the image channel representation, the number of image channel representation regions of the image channel representation, and/or the number of dimensions of each image channel representation region of the image channel representation.

The term "image channel representation region" may refer to an electronically managed data construct that is configured to describe a region of an image character representation for a corresponding character pattern position that corresponds to a candidate character pattern for the character pattern position. The image channel representation region may correspond to a particular candidate character pattern for the particular character pattern position associated with the image channel representation. The number of image channel representation regions may be determined based at least in part on the number of candidate character patterns for a particular character pattern position. In some embodiments, the visual representation of the image channel representation region may be indicative of whether the corresponding candidate character pattern is present or absent in an associated character pattern position of an associated categorical input feature. For example, in some embodiments, a white value for the image channel representation region may be indicative of the presence of the corresponding candidate character pattern in the categorical input feature. As another example, in some embodiments, a black value for the image channel representation region may be indicative of the absence of the corresponding candidate character pattern in the categorical input feature.

The term "expanded representation" may refer to an electronically managed data construct that configured to describe a categorical input feature, where each image channel representation for the categorical input feature is integrated into an image channel representation for a predecessor image channel representation for the image channel representation as determined based at least in part on the image channel order for the categorical input feature. The expanded representation may comprise a plurality of image channel representations, each associated with a character pattern position of the plurality of character pattern positions of the categorical input feature. In some embodiments, an expanded representation set may be generated by utilizing a channel aggregation machine learning model. In some embodiments, generating an expanded representation of a categorical input feature includes: determining a low-ordered subset of the plurality of image channel representations for the categorical input features that comprises all of the plurality of image channel representations except a highest-ordered image channel representation as determined based at least in part on the image channel order (e.g., for the categorical input feature "A53," a low-ordered subset that includes the image channel representation for "A" and the image channel representation for "5"); for each image channel representation in the low-ordered subset that is selected in accordance with the image channel order starting with an in-subset highest-ordered image channel representation in the low-ordered subset (e.g., for the low-ordered subset that includes the image channel representation for "A" and the image channel representation for "5," starting with the -subset highest-ordered image channel representation corresponding to the image character representation for "5"): (a) identifying a successor image channel representation of the plurality of image channel representations for the image channel representation based at least in part on the image channel order (e.g., for the image channel representation for "5," the successor image channel representation for "3"), (b) updating a channel size dimension data object for the image channel representation based at least in part on a successor channel size dimension data object for the predecessor image channel representation; and (c) updating the image channel representation by resizing image channel representation for the image channel representation based at least in part on the channel size dimension data object (e.g., updating the image channel representation for "5" so the image channel representation for "5" can integrate nine of the image channel representation for "3," given the count of candidate character patterns for the character pattern position associated with "3" is nine); determining a high-ordered subset of the plurality of image channel representations that comprises all of the plurality of image channel representations except a lowest-ordered image channel representation of the plurality of image channel representations as determined based at least in part on the image channel order (e.g., for the categorical input feature "A53," a high-ordered subset that includes the image channel representation for "5" and the image channel representation for "3"); and for each image channel representation in the high-ordered subset starting with an in-subset lowest-ordered image channel representation in the high-ordered subset (e.g., for the high-ordered subset that includes the image channel representation for "5" and the image channel representation for "3," starting with the in-subset lowest-ordered image channel representation corresponding to "5"): (a) generating an image location for the image channel representation in the lowest-ordered image channel representation based at least in part on each predecessor image channel representation for the image channel representation as determined based at least in part on the image channel order, and (b) updating the image channel representation by integrating the image channel representation into the lowest-ordered image channel representation in accordance with the image location.

The term "expanded representation set" may refer to an electronically managed data construct that is configured to describe a representation of an event that is determined based a set of image channel representations for a particular character pattern position of the categorical input feature for the event. For example, given an event that is associated with five ICD codes for a clinical visit event, each character pattern position of the five ICD codes may be associated with an expanded representation set that is generated by processing the image channel representations for the character pattern positions using a channel aggregation machine learning model. In an exemplary scenario, if the five ICD codes include "A22," "B33," "C32," "D56," and "F88," then the expanded representation set for the first character position may be generated by processing the following using a channel aggregation machine learning model: the image channel representation for "A," the image channel representation for "B," the image channel representation for "C," the image channel representation for "D," and the image channel representation for "F." In some embodiments, the set comprising the image channel representation for "A," the image channel representation for "B," the image channel representation for "C," the image channel representation for "D," and the image channel representation for "F" is referred to as a "co-ordered channel subset," as all of the noted image channel representations are associated with character patterns having a common character pattern position.

The term "per-channel representation segment" may refer to an electronically managed data construct that is configured to describe a subset of expanded representation sets for a set of events that correspond to a common character pattern position. For example, given a clinical visit event that is associated with five ICD codes, where the five ICD codes include "A22," "B33," "C32," "D56," and "F88," then as discussed above the expanded representation set for the first character position of the clinical visit event may be generated by processing the following using a channel aggregation machine learning model: the image channel representation for "A," the image channel representation for "B," the image channel representation for "C," the image channel representation for "D," and the image channel representation for "F." Now, consider further that the clinical visit event may be one of n clinical visit events, each of which may be associated with an expanded representation set for the first character position. In this example, the set of all expanded representation sets for the first character pattern position may be grouped together as part of a per-channel representation segment. In some embodiments, because a set of events may be associated with a temporal order (e.g., as determined based at least in part on a time ordering of clinical visits), then each per-channel representation segment for the set of events may also be associated with a temporal order, such that each expanded representation set in the per-channel representation segment is associated with a temporally precedent subsegment of the per-channel representation segment. For example, given a set of three ordered events E1, E2, and E3, then the per-channel representation segment for a first character pattern position of the set of three ordered events may be ordered such that the temporally precedent subsegment for the expanded event representation for E2 in a per-channel representation segment for a first character pattern position may consist of E1. As another example, given a set of three ordered events E1, E2, and E3, then the per-channel representation segment for a first character pattern position of the set of three ordered events may be ordered such that the temporally precedent subsegment for the expanded event representation for E2 in a per-channel representation segment for a first character pattern position may consist of E1 and E2.

The term "cumulative expanded representation" may refer to an electronically managed data construct that is configured to describe a representation of an image channel representation of a categorical input feature, where representation is determined based at least in part on a temporally precedent subsegment of the per-channel representation segment for a character pattern position of the particular image channel representation. For example, given an image channel representation that is associated with the mth character pattern position of an nth event, the cumulative expanded representation may be determined based at least in part on all expanded representation sets for the mth character pattern position that correspond to the events $\{1, \ldots, n\}$. As another example, given an image channel representation that is associated with the mth character pattern position of an nth event, the cumulative expanded representation may be determined based at least in part on all expanded representation sets for the mth character pattern position that correspond to the events $\{1, \ldots, n\}$. In some embodiments, the events may be associated with an associated event order. As such, the cumulative expanded representation may be generated for a categorical input feature based at least in part on a temporally precedent subsegment of a channel representation segment such that the categorical input feature and one or more categorical input features temporally precedent are included in the cumulative expanded representation. In some embodiments, the cumulative expanded representation may correspond to a particular event such that the cumulative expanded representation describes one or more categorical input feature associated with said event.

The term "compact event representation" may refer to an electronically managed data construct configured to describe a representation of an event that is determined based at least in part on processing all of the expanded representations in the expanded representation for the event using a feature aggregation machine learning model. For example, given an event that is associated with a set of three-character ICD codes and thus has three expanded representations in the expanded representation set for the event, the three expanded representations may be processed using a feature aggregation machine learning model in order to generate the compact event representation for the particular event. The compact event representation may aggregate the plurality of image channel representations into a single image representation. In some embodiments, this may be accomplished via a feature aggregation machine learning model.

The term "cumulative compact event representation" may refer to an electronically managed data construct configured to describe an event in a set of ordered events based at least in part on the compact event representations in a predecessor subset of the set of ordered events. For example, given a set of ordered events $\{E1, E2, E3\}$ (where E1 is deemed to occur prior to E2 and E2 deemed to occur prior to E3), then the cumulative compact event representation for E2 may be determined based at least in part on the compact event representations in a predecessor subset for E2 (which may consist of E1 or consist of E2 and E3, depending on the embodiment).

The term "channel aggregation machine learning model" may refer to an electronically stored data construct that is configured to describe parameters, hyper-parameters, and/or stored operations of a machine learning model that is configured to process a co-ordered channel set for an image channel representation to generate an expanded representation set for the image channel representation. In some embodiments, the channel aggregation machine learning model may process the plurality image channel representations described by the co-ordered channel set and perform one or more mathematical or logical operations on the plurality of expanded representations to generate an expanded representation set.

The term "feature aggregation machine learning model" may refer to an electronically stored data construct that is configured to describe parameters, hyper-parameters, and/or stored operations of a machine learning model configured to process a plurality of expanded representations for a set of events to generate a compact event representation for an event among the set of events. In some embodiments, the feature aggregation machine learning model may process the plurality of expanded representations and perform one or more mathematical or logical operations on the plurality of expanded representations to generate a compact event representation.

The term "feature type aggregation machine learning model" may refer to an electronically stored data construct that is configured to describe parameters, hyper-parameters, and/or stored operations of a machine learning model that is configured to process a plurality of cumulative compact event representations to generate a historical representation. In some embodiments, the plurality of cumulative compact event representations may each correspond to a categorical input feature type (i.e., a type of structure text input feature). In some embodiments, the feature type aggregation machine learning model may process the plurality of cumulative compact event representations and perform one or more mathematical or logical operations on the plurality of expanded representations to generate a cumulative compact event representation.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 provides an exemplary overview of an architecture 100 that can be used to practice embodiments of the present invention. The architecture 100 includes a predictive data analysis system 101 and one or more external computing entities 102. For example, at least some of the one or more external computing entities 102 may provide prediction inputs to the predictive data analysis system 101 and receive predictive outputs from the predictive data analysis system 101 in response to providing the prediction inputs. As another example, at least some of the external computing entities 102 may provide prediction inputs to the predictive data analysis system 101 and request performance of particular prediction-based actions in accordance with the provided predictions. As a further example, at least some of the external computing entities 102 may provide training data objects to the predictive data analysis system 101 and request the training of a predictive model in accordance with the provided training data objects. In some of the noted embodiments, the predictive data analysis system 101 may be configured to transmit parameters and/or hyper-parameters of a trained machine learning model to the external computing entities 102.

In some embodiments, the predictive data analysis computing entity 106 and the external computing entities 102 may be configured to communicate over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis computing entity 106 may include a predictive data analysis computing entity 106 and a storage subsystem 108. The predictive data analysis computing entity 106 may be configured to train a prediction model based at least in part on the training data 122 stored in the storage subsystem 108, store trained prediction models as part of the model definition data 121 stored in the storage subsystem 108, utilize trained models to generate predictions based at least in part on prediction inputs provided by an external computing entity 102, and perform prediction-based actions based at least in part on the generated predictions. The storage subsystem may be configured to store the model definition data 121 for one or more predictive analysis models and the training data 122 uses to train one or more predictive analysis models. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive data analysis computing entity 106 includes a feature extraction engine 111, a predictive analysis engine 112, and a training engine 113. The feature extraction engine 111 may be configured to process prediction inputs to generate relevant processed features for predictive data analysis processing by the predictive analysis engine 112. For example, the feature extraction engine 111 may be configured to generate image representations of categorical feature data (e.g., as described with reference to FIGS. 4-28). The predictive analysis engine 112 may be configured to perform predictive data analysis based at least in part on the processed features generated by the feature extraction engine 111. For example, the predictive analysis engine 112 may be configured to perform image-based predictive data analysis (e.g., by using one or more CNNs, as for example described with reference to FIGS. 29-31) based at least in part on the image representations generated by the feature extraction engine. The training engine 113 may be configured to train at least one of the feature extraction engine 111 and the predictive analysis engine 112 in accordance with the training data 122 stored in the storage subsystem 108. Example operations of the training engine 113 are described with reference to FIG. 32.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

To address the technical challenges associated with performing predictive data analysis in a computationally efficient and predictively reliable manner, various embodiments of the present invention describe a method, apparatus, systems, computing devices, computing entities, and/or the like for generating one or more image representation for of one or more categorical input features comprising a plurality of character patterns for a plurality of character positions.

Certain embodiments utilize systems, methods, and computer program products that perform predictive analysis of categorical data using image-based machine learning models (e.g., machine learning models that utilize CNNs).

Various embodiments of the present invention address technical challenges related to efficiently and reliably performing predictive data analysis in prediction domains. For example, in some embodiments, proposed solutions disclose generating an image representation of one or more categorical input features comprising a plurality of character patterns for a plurality of character positions. The image representation may comprise a plurality of image representation channels for each character position and each image representation channel may comprise a plurality of image representation channel regions corresponding to a candidate character pattern for the particular character position. The image representations may be further processed to generate an expanded representation, cumulative expanded representation, historical representation, compact event representation, and cumulative compact event representation representative of a plurality of categorical input features. After generation, the image representation can be utilized by an image-based machine learning model (e.g., a machine learning model utilizing a CNN) to perform efficient and reliable predictive data analysis. The resulting machine learning solutions are more efficient to train and more reliable when trained. Additionally, various embodiments of the present invention further address technical challenges related to determining the evolution of temporal patterns by generating an image representation representative of a plurality of categorical input features such that the image representation may be utilized by an image-based machine learning model (e.g., a machine learning model utilizing a CNN) to determine one or more temporal patterns.

Image-Based Predictive Inference

FIG. 4 is a flowchart diagram of an example process 400 for performing image-based predictive data analysis. Via the various steps/operations of process 400, the predictive data analysis computing entity 106 may process a categorical input feature (e.g., structured text input features) to generate an image-based prediction. The predictive data analysis computing entity 106 may then utilize image-based machine learning solutions (e.g., solutions utilizing CNNs) to infer predictive insights from the categorical input feature, such as structured text input features.

At step/operation 401, the feature extraction engine 111 of the predictive data analysis computing entity 106 obtains a categorical input feature. Examples of a categorical input feature include structured text input features, including feature data associated with a predictive entity. For example, the categorical input feature may include feature data, such as medical feature data, associated with a particular patient predictive entity. As another example, the categorical input feature may include feature data, such as transactional feature data, associated with a medical facility predictive entity.

At step/operation 402, the feature extraction engine 111 generates one or more image representations based at least in part on the categorical input feature obtained/received in step/operation 401. In some embodiments, to generate the one or more image representations based at least in part on the categorical input feature, the feature extraction engine 111 retrieves configuration data for a particular image-based processing routine from the model definition data 121 stored in the storage subsystem 108. Examples of the particular-image-based processing routines are discussed below with reference to FIGS. 4-28. However, one of ordinary skill in the art will recognize that the feature extraction engine 111 may generate the one or more images by applying any suitable technique for transforming the categorical input feature into the one or more images. In some embodiments, the feature extraction engine 111 selects a suitable image-based processing routine for the categorical input feature given the one or more properties of the categorical input feature (e.g., size of the categorical input feature, a character pattern of the categorical input feature, and/or the like).

In some embodiments, step/operation 402 may be performed in accordance with the various steps/operations of the process depicted in FIG. 5, which is a flowchart diagram of an example process for generating an image representation for the categorical input feature.

The process 500 depicted in FIG. 5 begins at step/operation 501, when the feature extraction engine 111 identifies a plurality of character patterns associated with a categorical input feature. In some embodiments, the feature extraction engine 111 may identify the plurality of character patterns based at least in part on the type of structured text input features described by the categorical input feature. For example, the categorical input feature may describe a type of structured text input feature such as, for example, an ICD code, HIC, or the like. Each structure text input feature type may be associated with a plurality of character positions and each character pattern position may be associated with a character pattern from one or more candidate character patterns.

For example, a categorical input feature may describe a type of structure text input feature associated with three character pattern positions, wherein the first character pattern position may include the candidate character patterns "A," "B," "C," or "D," the second character pattern position may include the candidate character patterns "1," "2," "3," "4," "5," "6," "7," "8," or "9," and the third character pattern position may include the candidate character patterns "1," "2," "3," "4," "5," "6," "7," "8," or "9." As such, feature extraction engine 111 may process a categorical input feature described by the aforementioned type of structure text input feature, wherein the categorical input feature comprises the structure text input feature "A53." The feature extraction engine 111 may identify the first character pattern position corresponds to a character pattern "A," the second character pattern position corresponds to a character pattern "5," and the third character pattern position corresponds to a character pattern "3."

At step/operation 502, the feature extraction engine 111 may generate an image channel representation associated with a character pattern position for each of the plurality of character pattern positions. In some embodiments, the image channel representation associated with the character pattern position may be determined based at least in part on the character pattern associated with the character pattern position as described by the categorical input feature. The image channel representation for each character pattern position may comprise a plurality of image channel representation regions. The number of image channel representation regions may be based at least in part on the number of candidate character patterns, such that each candidate character pattern associated with the image channel representation corresponds to a specific image channel representation region.

At step/operation 503, the feature extraction engine 111 may generate an image representation of the categorical feature input. The image representation of the categorical input feature may comprise the plurality of image channel representations as generated in step/operation 502.

At step/operation 504, the feature extraction engine 111 may generate an image representation set of a plurality of image representations for a plurality of categorical input features. In some embodiments, step/operations 501-503 may be repeated for one or more additional categorical input features such that an image representation is generated for each of the one or more additional categorical input features. The image representation set may comprise the plurality of image representations corresponding to the plurality of categorical input features.

At step/operation 505, the feature extraction engine 111 may generate a historical representation. In some embodiments, the historical representation may be based at least in part on the image representation set as generated in step/operation 504.

An operational example of an image representation template of a categorical input feature 600 is depicted in FIG. 6. By way of continuing the example described above, a categorical input feature may comprise the structure text input feature "A53." The categorical input feature may describe a type of structure text input feature associated with three character pattern positions, where the first character pattern position corresponds to a character pattern "A," the second character pattern position corresponds to a character pattern "5," and the third character pattern position corresponds to a character pattern "3." As depicted in FIG. 6, the feature extraction engine 111 may generate the image representation template of the categorical input feature 600 comprising the image channel representation 601, 602, and 603 corresponding to the first character pattern position, second character pattern position, and third character pattern position, respectively.

By way of continuing the example described above, feature extraction engine 111 may also identify the candidate character patterns for each character pattern position. The feature extraction engine 111 may determine the first character pattern position may include the candidate character patterns "A," "B," "C," or "D," the second character pattern position may include the candidate character patterns "1," "2," "3," "4," "5," "6," "7," "8," or "9," and the third character pattern position may include the candidate character patterns "1," "2," "3," "4," "5," "6," "7," "8," or "9." As such, the feature extraction engine 111 may generate 4 image channel representation regions 604-607 for the first character pattern position, 9 image channel representation regions 608-616 corresponding to the second character pattern position, and 9 image channel representation regions 617-622 corresponding to the third character pattern position. Each image channel representation region may correspond to a candidate character pattern for the particular image channel representation. For example, image channel representation region 605 may correspond to the candidate character pattern "B" for the first character pattern position.

An operational example of an image representation 700 of a categorical input feature is further depicted in FIG. 7. By way of continuing the example described above, feature extraction engine 111 may generate the image channel representation associated with a character pattern position based at least in part on the character pattern associated with the character pattern position. By way of continuing the example described above, the categorical input feature comprising the structure text input feature "A53" may describe a first character pattern position corresponding to the character pattern "A," the second character pattern position corresponding to the character pattern "5," and the third character pattern position corresponding to a character pattern "3." As such, the feature extraction engine 111 may generate the image channel representation 601 corresponding to the first character pattern position based at least in part on the character pattern "A" corresponding to the image channel representation region 604. In some embodiments, the image channel representation region 604 corresponding to the candidate character pattern "A" may correspond to a white value for the image channel representation region 604, indicative of the presence of the character pattern "A," while a black value for the image channel regions 605, 606, and 607 are indicative of the absence of the character patterns "B," "C," and "D." Similarly, for the image channel representation 602, the image channel representation region 609 may have a white value indicative of the presence of the character pattern "5" while the image channel representation regions 608-611 and 613-613 are indicative of the absence of character patterns "1," "2," "3," "4," "6," "7," "8," and "9." Additionally, for the image channel representation 603, the image channel representation region 619 may have a white value indicative of the presence of the character pattern "3" while the image channel representation regions 617-618 and 620-625 are indicative of the absence of character patterns "1," "2," "4," "5," "6," "7," "8," and "9." As such, the image channel representations 601, 602, and 603 may be indicative of the values "A," "5," and "3," respectively such that image representation 700 accurately describes the categorical input feature "A53."

In some embodiments, step/operation 503 may be performed in accordance with the various steps/operations of the process 800 that is depicted in FIG. 8, which is a flowchart diagram of an example process for resizing an image channel representation.

The process 800 depicted in FIG. 8 begins at step/operation 801, when the feature extraction engine 111 determines a low-ordered subset for a plurality of image channel representations. In some embodiments, the plurality of image channel representations is each associated with an image channel order determined based at least in part on the character pattern position order of the plurality of character patterns. For example, the first character pattern position corresponds to the first image representation channel and the second character pattern position second image representation channel. As such, the first image representation channel is associated with a first position and the second image representation channel is associated with a second position in the plurality of image representation channels.

The feature extraction engine 111 may determine a low-ordered subset of the plurality of image channel representations that comprises all of the plurality of image channel representations except the highest ordered image channel representation as determined based at least in part on the image channel order. For example, if the image representation comprises three image channel representations, wherein the first image channel representation corresponds with the first position, the second image channel representation corresponds with the second position, and third image channel representation corresponds with the third position, the low-ordered subset of the plurality of image channel representations comprises the first image channel representation and second image channel representation, but does not include the third image channel representation.

At step/operation 802, the feature extraction engine 111 identifies a successor image channel representation for each image channel representation in the low-ordered subset. In some embodiments, the successor image channel representation may refer to the next ordered image channel representation in the low-ordered subset of the plurality of image channel representations. By way of continuing the example described above, the feature extraction engine 111 may identify the second image channel representation as a successor channel representation to the first image channel representation.

Additionally, or alternatively, the feature extraction engine 111 may also identify a predecessor image channel representation for each image channel representation in the low-ordered subset. In some embodiments, the predecessor image channel representation may refer to the preceding image channel representation in the low-ordered subset of the plurality of image channel representations. By way of continuing the example described above, the feature extraction engine 111 may identify the first image channel representation as a predecessor channel representation to the second image channel representation.

At step/operation 803, the feature extraction engine 111 may update a channel size dimension data object for each image channel representation in the low-ordered subset. In some embodiments, the feature extraction engine 111 may begin with the in-subset highest-ordered image channel representation. Returning to the previous example, the feature extraction engine 111 may start with the second image channel representation.

In some embodiments, the feature extraction engine 111 may update a predecessor channel dimension object for each predecessor image channel representation in the low-ordered subset based at least in part on an associated successor channel size dimension data object. In some embodiments, the channel size dimension data object may describe the dimensions of the image channel representation, the dimensions of each image channel representation region, and count of the total image channel representation regions. By way of continuing the example described above, the feature extraction engine 111 may update the channel size dimension data object for the first image channel representation based at least in part on the channel size dimension data object associated with the second image channel representation.

In some embodiments, the channel size dimension data object for the in-subset highest-ordered image channel representation in the low-ordered subset may be updated based at least in part on the channel size dimension data object for the image channel representation not included in the low-ordered subset. By way of continuing the example described above, the feature extraction engine 111 may update the channel size dimension data object for the second image channel representation based at least in part on the channel size dimension data object of the third image channel representation.

At step/operation 804, the feature extraction engine 111 may update each image channel representation in the low-ordered subset by resizing each image channel representation based at least in part on the channel size dimension object. In some embodiments, the channel size dimensions object may be indicative of the dimensions of each image channel representation region and the count of image channel representation regions for the image channel representation.

At step/operation 805, the feature extraction engine 111 may generate the image representation. In some embodiments, the feature extraction engine 111 may generate the image representation by generating each image channel representation. Each image channel representation may be generated based at least in part on the channel size dimension object such that each image channel representation included in the low-ordered subset of the plurality of image channel representations is resized.

An operational example of resizing image channel representations for an image representation 900 is depicted in FIGS. 9A and 9B. By way of continuing the example described above, feature extraction engine 111 may generate the image representation 900 for a categorical input feature "A53," such that the image representation 900 comprises a first image channel representation 902, a second image channel representation 904, and a third image channel representation 906. Each image channel representation may have an associated size dimension data object indicative of the image channel representation dimension, each image channel representation region dimensions, and a count of the total image channel representation regions.

For example, as depicted in FIG. 9A, the second image channel representation 904 may be associated with a channel size dimension data object describing nine image channel representation regions, each corresponding to a corresponding candidate character pattern selected from the set of character patterns comprising "1," "2," "3," "4," "5," "6," "7," "8," and "9." The channel size dimension data object may also describe each image channel representation region with a dimension length of 1 pixel and a dimension width of 1 pixel. The channel size dimension data object may also describe the dimensions of the image channel representation 904. For example, the size dimension data object may be indicative of the width dimension 912 of 3 and the length dimension 914 of 3 for the second image channel representation 904. As another example, the size dimension data object may be indicative of the width dimension 908 of 2 and the length dimension 910 of 2 for the first image channel representation 902. As yet another example, the size dimension data object may be indicative of the width dimension 916 of 3 and the length dimension 918 of 3 for the third image channel representation 906. In some embodiments, the length dimensions and width dimensions for the second image channel representation may be based at least in part on the plurality of image channel representation regions.

The image representation 900 may be resized as depicted in FIG. 9B by following the steps/operations described in FIG. 8. The feature extraction engine 111 may determine a low-ordered subset comprising the first image channel representation 902 and the second image channel representation 904 which excludes the third image channel representation 906. The feature extraction engine 111 may then start with the second image channel representation 904, which is the in-subset highest-ordered image channel representation in the low-ordered subset. The feature extraction engine 111 may identify a successor image channel representation for the second image channel representation 904, which would be the third image channel representation 906. The third image channel representation 906 may be associated with a channel size dimension data object describing the dimensions of the image channel representation region each with a dimension length of 1 pixel and a dimension width of 1 pixel, a total count of 9 image channel representation regions, and the dimensions of the image channel representation 906 with a width dimension 928 of 3 pixels and a length dimension 930 of 3 pixels.

The feature extraction engine 111 may then update the channel size dimension data object corresponding to the second image channel representation 904 based at least in part on the channel size dimension data object corresponding to the third image channel representation 906. In some embodiments, the feature extraction engine 111 may update the channel size dimension data object associated with each image channel representation region to incorporate the dimensions of the third image channel representation 906.

As such, the channel size dimension data object associated with the second image channel representation 904 may describe an image region size of 3 by 3 pixels, a count of image channel representation region indicative of 9 image channel representation regions, and an image channel representation dimension (defined by the width 924 and the height 926) of 9 by 9 pixels.

Similarly, for the first image channel representation, feature extraction engine 111 may update the region size associated the first image channel representation 902 region to incorporate the dimensions of the second image channel representation 904. As such, the dimensions data object associated with the first image channel representation may describe an image region size of 9 by 9 pixels, a count of image channel representation region indicative of four image channel representation regions, and an image channel representation dimension (defined by the width 920 and the height 922) of 18 by 18 pixels.

In some embodiments, step/operation 805 may be performed in accordance with the various steps/operations of the process 1000 that depicted in FIG. 10, which is a flowchart diagram of an example process for resizing an image channel representation The process 1000 depicted in FIG. 10 begins at step/operation 1001, when the feature extraction engine 111 determines a high-ordered subset of a plurality of image channel representations. As described with respect to step/operation 801, the plurality of image channel representations is associated with an image channel order determined based at least in part on the character pattern position order of the plurality of character patterns. For example, the first character pattern position corresponds to the first image representation channel and the second character pattern position second image representation channel. As such, the first image representation channel is associated with a first position and the second image representation channel is associated with a second position in the plurality of image representation channels.

The feature extraction engine 111 may determine a high-ordered subset of the plurality of image channel representations that comprises all of the plurality of image channel representations except the lowest ordered image channel representation as determined based at least in part on the image channel order. For example, if the image representation comprises three image channel representations, wherein the first image channel representation corresponds with the first position, the second image channel representation corresponds with the second position, and third image channel representation corresponds with the third position, the high-ordered subset of the plurality of image channel representations comprises the second image channel representation and third image channel representation, but does not include the first image channel representation.

In some embodiments, the feature extraction engine 111 may identify a predecessor image channel representation for each image channel representation in the high-ordered subset. In some embodiments, the predecessor image channel representation may refer to the preceding ordered image channel representation in the high-ordered subset of the plurality of image channel representations. Returning to the previous example, the feature extraction engine 111 may identify the first image channel representation as a predecessor channel representation to the second image channel representation. In some embodiments, the feature extraction engine 111 may also identify a successor image channel representation for each image channel representation in the high-ordered subset, which may refer to the next ordered image channel representation in the high-ordered subset of the plurality of image channel representations.

At step/operation 1002, the feature extraction engine 111 generates an image location for each image channel representation in the high-ordered subset. The feature extraction engine 111 may generate the image location for each image channel representation in the high-ordered subset starting the with lowest-ordered image channel representation in the high-ordered subset. By way of continuing the example described above, the feature extraction engine 111 may identify the second image channel representation as the lowest-ordered image channel representation in the high-ordered subset. In some embodiments, the feature extraction engine 111 may generate an image location for each image channel representation in the high-ordered subset based at least in part on the predecessor image channel representation. In some embodiments, the image location for the image channel representation is determined based at least in part on the value of each image channel representation region of the predecessor image channel representation. In some embodiments, the image location for the in-subset lowest-ordered image channel representation in the high-ordered subset may be generated based at least in part on the image channel representation not included in the high-ordered subset. By way of continuing the example described above, the feature extraction engine 111 may generate an image location for the second image channel representation based at least in part on the first image channel representation.

At step/operation 1003, the feature extraction engine 111 may update the image channel for each image channel representation in the high-ordered subset. In some embodiments, the feature extraction engine 111 may update the image channel for each image channel representation in the high-ordered subset by integrating the image channel representation into the lowest-ordered image channel representation in accordance with the image location.

In some embodiments, the image channel representation for the categorical input feature may now be referred to as an expanded representation. The expanded representation may comprise a plurality of image channel representations, each associated with a character pattern position of the plurality of character pattern positions of the categorical input feature.

An operational example of resizing image channel representations is depicted in FIGS. 11-13. FIG. 11 depicts the first image channel representation 1102, second image channel representation 1104, and third image channel representation 1106 after the dimension resizing described by the step/operations in FIG. 8. The feature extraction engine 111 may then determine the high-ordered subset of the plurality of image channel representations comprising the second image channel representation 1104 and third image channel representation 1106 but excluding the first image channel representation 1102. As such, the feature extraction engine 111 may generate an image location 1112 starting with the second image channel representation 1104. The feature extraction engine 111 may generate the image location 1112 for the second image channel representation 1104 based at least in part on the first image channel representation 1102. The first image channel representation 1102 has an image channel representation region which corresponds to a white value, indicating the presence of the candidate character pattern corresponding to the image channel representation region. In this example, the candidate character pattern is the character "A." The feature extraction engine 111 may then generate image location 1114 for the second image channel representation 1104 based at least in part on the value of the image location 1112 in the first image channel representation 1102. The feature extraction engine 111 may then update the second image channel representation 1108 by integrating the second image channel representation 1104 into the first image channel representation 1102. As such, the second image channel representation 1108 now is associated with a channel size dimension data object indicative of a describing 36 image channel representation regions. Each of the 36 image channel representation regions is indicative of a unique combination of a first candidate character pattern and a second candidate character pattern. In this example, the second image channel representation 1108 is indicative of the character pattern "A5."

Additionally, the feature extraction engine 111 may generate an image location 1118 for the third image channel representation 1106 based at least in part on the second image channel representation 1108. The second image channel representation 1108 has an image channel representation region 1116 which corresponds to a white value indicating the presence of the candidate character pattern corresponding to the image channel representation region. In this example, the candidate character pattern is "A5." The feature extraction engine 111 may then generate the image location 1118 for the third image channel representation 1106 based at least in part on the value of the image channel representation region 1116 in the second image channel representation 1108. The feature extraction engine 111 may then update the third image channel representation 1110 by integration the third image channel representation 1106 into the second image channel representation region 1108. As such, the third image channel representation 1110 now is associated with a channel size dimension data object indicative of a describing 324 image channel representation regions. Each of the 324 image channel representation regions is indicative of a unique combination of a first candidate character pattern, a second candidate character pattern, and a third candidate character pattern. In this example, the image channel representation region 1120 of third image channel representation 1110 is indicative of the character pattern "A53."

FIG. 12 depicts a resulting first image channel representation 1202, second image channel representation 1204, and third image channel representation 1206 for a different categorical input feature. In this instance, the categorical input feature may comprise the structure text input feature "D53" may describe a first character pattern position corresponding to the character pattern "D," the second character pattern position corresponding to the character pattern "5," and the third character pattern position corresponding to a character pattern "3." Additionally, the categorical input feature may be of the same type of structure text input feature as the categorical input feature described in the previous examples, including in FIG. 11. The feature extraction engine 111 may similarly perform the step/operations associated with FIG. 8 to generate the first image channel representation 1202, the second image channel representation 1204, and the third image channel representation 1206.

The feature extraction engine 111 may then determine the high-ordered subset of the plurality of image channel representations comprising the second image channel representation 1204 and third image channel representation 1206 but not comprising the first image channel representation 1202. As such, the feature extraction engine 111 may generate an image location 1212 starting with the second image channel representation 1204. The feature extraction engine 111 may generate the image location 1212 for the second image channel representation 1204 based at least in part on the first image channel representation 1202. The first image channel representation 1202 has an image location 1212 which corresponds to a white value, indicating the presence of the candidate character pattern corresponding to the image channel representation region. In this example, the candidate character pattern is the character "D." The feature extraction engine 111 may then generate image location 1214 for the second image channel representation 1204 based at least in part on the value of the image location 1212 in the first image channel representation 1202. The feature extraction engine 111 may then update the second image channel representation 1208 by integrating the second image channel representation 1204 into the first image channel representation 1202. As such, the second image channel representation 1208 now is associated with a channel size dimension data object indicative of a describing 36 image channel representation regions. Each of the 36 image channel representation regions is indicative of a unique combination of a first candidate character pattern and a second candidate character pattern. In this example, the second image channel representation 1208 is indicative of the character pattern "D5."

Additionally, the feature extraction engine 111 may generate an image location 1218 for the third image channel representation 1206 based at least in part on the second image channel representation 1208. The second image channel representation 1208 has an image channel representation region 1216 which corresponds to a white value indicating the presence of the candidate character pattern corresponding to the image channel representation region. In this example, the candidate character pattern is "D5." The feature extraction engine 111 may then generate the image location 1218 for the third image channel representation 1206 based at least in part on the value of the image channel representation region 1216 in the second image channel representation 1208. The feature extraction engine 111 may then update the third image channel representation 1210 by integration of the third image channel representation 1206 into the second image channel representation 1208. As such, the third image channel representation 1210 now is associated with a channel size dimension data object indicative of a describing 108 image channel representation regions. Each of the 108 image channel representation regions is indicative of a unique combination of a first candidate character pattern, a second candidate character pattern, and a third candidate character pattern. In this example, the image channel representation region 1220 of third image channel representation 1210 is indicative of the character pattern "D53." As such, the feature extraction engine 111 updated the image representation such that the image representation is indicative of the character pattern "D53."

FIG. 13 depicts two image representations for two categorical input features. The first image representation comprising first image channel representation 1302, second image channel representation 1304, and third image channel representation 1306 corresponds to the categorical input feature describing a structure text input feature "A53." The second image representation comprising first image channel representation 1314, second image channel representation 1316, and third image channel representation 1318 corresponds to the categorical input feature describing a structure text input feature "A59." Although the first image channel representations 1302 and 1314 and second image channel representations 1304 and 1316 describe the same character pattern "A" corresponding to the same image channel representation region (e.g., image channel representation regions 1308 and 1320) and "A5" corresponding to the same image channel representation region (e.g., image channel representation regions 1310 and 1322), the third image channel representations 1306 and 1318 differentiates the two image representations. The third image channel representation 1306 corresponding to the first categorical input feature describes an image channel representation region 1312 that uniquely indicates the categorical input feature "A53." Similarly, the third image channel representation 1318 corresponding to the second categorical input feature describes an image channel representation region 1324 that uniquely indicates the categorical input feature "A59." As such, the highest ordered image channel in the image representation may uniquely identify the categorical input feature. Additionally, a machine learning model may also identify that the first image channel representation 1302 and 1314 and second image channel representation 1304 and 1316 corresponding to the two image representations are the same.

In some embodiments, step/operation 504 may be performed in accordance with the various steps/operations of the process 1400 that is depicted in FIG. 14, which is a flowchart diagram of an example process for generating an expanded representation set for the image channel representation. An expanded representation set comprises one or more expanded image representations as generated by the step/operations described by FIG. 10. In some embodiments, an expanded representation set may comprise one or more expanded image representations associated with the same event, such as a clinical event. For example, an expanded representation set may be indicative of one or more clinical events associated with a user's visit to a healthcare facility.

The process 1400 depicted in FIG. 14 begins at step/operation 1401, when the feature extraction engine 111 identifies a co-ordered channel set associated with a plurality of channel categorical input features. In some embodiments, the feature extraction engine 111 may select a categorical input feature from a plurality of categorical input features at step/operation 401. The feature extraction engine 111 may also identify a co-ordered channel set that is associated with the plurality of categorical input features. The co-ordered channel set may comprise a plurality of co-ordered channel subsets each associated with an image channel representation corresponding to the plurality of each character position for the plurality of categorical input features. For example, three categorical input features may be associated with the same structure text input feature type, such as a type of structure text input feature associated with three character pattern positions. As such, the co-ordered channel set may comprise a first co-ordered channel subset set, a second co-ordered channel subset, and a third co-ordered channel subset. Each co-ordered channel subset may comprise the three image channel representations for the corresponding image channel set from each of the three categorical input features. For example, the first image channel set may comprise the first image channel representation for the first categorical input feature, second categorical input feature, and third categorical input feature.

At step/operation 1402, the feature extraction engine 111 may generate the expanded representation set for the image channel representation. In some embodiments, the feature extraction engine 111 may generate the expanded representation set for the image channel representation by processing the co-ordered channel set for the image channel representation using a channel aggregation machine learning model. In some embodiments, the channel aggregation machine learning model may be a trained machine learning model configured to process each image channel representation in each image channel set of the co-ordered channel set to generate an expanded representation set for each image channel in the co-ordered channel set. In some embodiments, the channel aggregation machine learning model may process the plurality image channel representations described by a co-ordered channel for each co-ordered channel subset and perform one or more mathematical or logical operations on the plurality of expanded representations to generate an expanded representation.

An operational example for generating the expanded representation set for each image channel set of the co-ordered channel set is depicted in FIG. 15. The feature extraction engine 111 generates an expanded representation for each categorical input feature of a plurality of categorical input features 1501, 1502, and 1503. Each expanded representation may be associated with a co-ordered channel subset associated with the plurality of categorical input features. For example, the co-ordered channel subset may comprise a first image channel comprising the first image channel representations 1504, 1507, and 1510 for the plurality of expanded representations. Similarly, the co-ordered channel set may comprise a second co-ordered channel subset comprising the second image channel representations 1505, 1508, and 1511 and a third co-ordered channel subset comprising the third image channel representations 1506, 1509, and 1512.

The feature extraction engine 111 may then generate an expanded representation set by utilizing a channel aggregation model 1513. The channel aggregation model 1513 may be configured to process as inputs each image channel representation (where an image channel representation may be a matrix) for a corresponding image channel representation to generate the expanded representation set for the corresponding image channel representation as an out (where an expanded representation set may also be a matrix). For example, the channel aggregation model 1513 may process the image channel representations associated with the first co-ordered channel subset for a first character pattern position to generate an expanded representation set 1514 depicting visually significant elements of the noted first image channel representations. Similarly, the channel aggregation model 1513 may process the image channel representations associated with the second co-ordered image channel subset for a second character pattern position to generate an expanded representation set 1515 depicting visually significant elements of the noted second image channel representations. Moreover, the channel aggregation model may process the image channel representations associated with the third co-ordered channel subset for a third character pattern position to generate an expanded representation set 1516 depicting visually significant elements of the noted third image channel representations.

Another operational example for generating the expanded representation set for each image channel set of the co-ordered image channel set is depicted in FIG. 16. The feature extraction engine 111 generates an expanded representation for each categorical input feature of a plurality of categorical input features 1601 and 1602. The first categorical input feature may comprise a structured text input feature "A53" 1601 and the second categorical input feature may comprise a structured text input feature "D53" 1602. The expanded representation of the first categorical input feature may comprise a first image channel representation 1603, a second image channel representation 1604, and a third image channel representation 1605. Similarly, the second categorical input feature may comprise a first image channel representation 1606, a second image channel representation 1607, and a third image channel representation 1608. Each expanded representation may be associated with a co-ordered channel set associated with the plurality of categorical input features. For example, the co-ordered channel set may comprise a first co-ordered channel subset comprising the first image channel representations 1603 and 1606, a second co-ordered channel subset comprising the second image channel representations 1604 and 1607, and a third co-ordered channel subset comprising the third image channel representations 1605 and 1608.

The feature extraction engine 111 may then generate an expanded representation set by utilizing a channel aggregation model 1609. The channel aggregation model 1609 may be configured to process each co-ordered channel subset in a co-ordered channel to generate the expanded representation set. For example, the channel aggregation model 1609 may process the image channel representations associated with the first co-ordered channel subset of the co-ordered channel set 1610 to generate an expanded representation set depicting visually significant elements of the first image channel representations. Similarly, the channel aggregation model 1609 may process the image channel representations associated with the second co-ordered channel subset of the co-ordered channel set to generate an expanded representation set 1611 depicting visually significant elements of the second image channel representations. Moreover, the channel aggregation model 1609 may process the image channel representations associated with the third co-ordered channel subset of the co-ordered channel set to generate an expanded representation set 1612 depicting visually significant elements of the third image channel representations.

The resulting expanded image representation set comprise the expanded image representations 1610, 1611, and 1612, each depicting an image representation that describes both categorical input features for each character position. For example, the first expanded image representation set depicts both the characters "A" and "D" associated with the first character position from categorical input features 1601 and 1602.

In some embodiments, step/operation 505 may also be performed in accordance with the various steps/operations of the process 1700 that is depicted in FIG. 17, which is a flowchart diagram of an example process for generating a historical representation based at least in part on a per-channel representation segment. The process 1700 begins at step/operation 1701, when the feature extraction engine 111 selects an expanded representation set from a plurality of expanded representation sets associated with a plurality of events. In some embodiments, the plurality of expanded representation sets may have been generated based at least in part on the one or more step/operations associated with FIG. 14 such that each expanded representation set is associated with an event. Each expanded representation set may comprise a plurality of expanded representations for a plurality of image channel representations.

At step/operation 1702, the feature extraction engine 111 may generate a per-channel representation segment. In some embodiments, the feature extraction engine 111 may generate a per-channel representation segment based at least in part on each expanded representation in the plurality of expanded representations that is associated with the image channel representation. In some embodiments, the plurality of expanded representations associated with the image channel representation may be determined based at least in part on an associated event for a corresponding categorical input feature. For example, expanded representations corresponding to the same event as the categorical input feature corresponding to the image channel representation may be associated. As another example, expanded representations corresponding to the same user as the categorical input feature corresponding to the image channel representation may be associated.

At step/operation 1703, the feature extraction engine 111 may generate a historical representation. In some embodiments, the feature extraction engine 111 may generate the historical representation based at least in part on the per-channel representation segment. For example, the historical representation may be indicative of one or more expanded representations corresponding to one or more categorical feature inputs. In some embodiments, each channel segment of the historical representation may be arranged in ascending temporal order, such that expanded representations associated with the most recent event are depicted first.

FIG. 18 depicts an operational example of a historical representation 1800. The feature extraction engine 111 may generate a per-channel representation segment based at least in part on each expanded representation selected by the feature extraction engine. The per-channel representation segment may comprise a first channel representation segment, second channel representation segment, and third channel representation segment. The feature extraction engine 111 may generate the historical representation 1800 based at least in part on the per-channel representation segment. The historical representation 1800 may comprise a first channel segment 1801, a second channel segment 1802, and a third channel segment 1803. Each channel segment of the historical representation may comprise one or more image channel representations associated with the selected expanded representation. An expanded representation set may comprise two expanded representations. The first expanded representation may comprise first image channel representation 1804, second image channel representation 1806, and third image channel representation 1808. The second expanded representation may comprise first image channel representation 1805, second image channel representation 1807, and third image channel representation 1809. In some embodiments, each channel segment of the historical representation may be arranged in ascending temporal order, such that expanded representations associated with the most recent event are depicted first.

In some embodiments, step/operation 505 may also be performed in accordance with the various steps/operations of the process 1900 that is depicted in FIG. 19, which is a flowchart diagram of an example process for generating a cumulative expanded representation based at least in part on a temporally precedent subsegment of the per-channel representation segment. The process 1900 begins at step/operation 1901, when the feature extraction engine 111 generates a cumulative expanded representation with respect to a particular channel representation. In some embodiments, feature extraction engine 111 may generate the cumulative expanded representation based at least in part on a temporally precedent subsegment of the per-channel representation segment for the particular image channel representation. For example, the feature extraction engine 111 may generate a cumulative expanded representation for an image channel representation by aggregating two or more adjacent image channel representations in a channel representation of the per-channel representation. In some embodiments, the feature extraction engine may generate the cumulative expanded representation for the image channel representation by aggregating two or more adjacent image channel representation associated with the same event as the image channel representation.

At step/operation 1902, the feature extraction engine 111 may generate a historical representation based at least in part on the cumulative expanded representation. For example, the historical representation may be indicative of one or more cumulative expanded representations corresponding to one or more categorical feature inputs. In some embodiments, each channel segment of the historical representation may be arranged in ascending temporal order, such that cumulative expanded representations associated with the most recent event are depicted first.

FIG. 20 depicts an operational example of a historical representation for a cumulative expanded representation 2000. The feature extraction engine 111 may first generate a cumulative expanded representation based at least in part on a temporally precedent subsegment of the per-channel representation segment for the particular image channel representation. Two cumulative expanded representations may be generated. The first cumulative expanded representation may comprise a first image channel representation 2004, a second image channel representation 2006, and a third image channel representation 2008. The second cumulative expanded representation may comprise a first image channel representation 2005, a second image channel representation 2007, and a third image channel representation 2009. The feature extraction engine 111 may then generate the historical representation 2000 comprising a first channel segment 2001, a second channel segment 2002, and a third channel segment 2003. The first channel segment 2001 may comprise the first image channel representation 2004 and 2005 corresponding to the first cumulative expanded representation and second cumulative expanded representation, respectively.

FIG. 21 depicts an operational example of a cumulative expanded representation wherein feature extraction engine 111 aggregated all expanded representation such that just the most recent image channel representation is described. As such, the historical representation 2100 comprising a first channel segment 2101, a second channel segment 2102, and a third channel segment 2103 may each comprise a single image channel representation 2104, 2105, and 2106, respectively, each corresponding to a single cumulative expanded representation.

In some embodiments, step/operation 504 may also be performed in accordance with the various steps/operations of the process depicted in FIG. 22, which is a flowchart diagram of an example process for generating a compact event representation. The process 2200 begins at step/operation 2201, when the feature extraction engine 111 selects an expanded representation set from a plurality of expanded representation sets. In some embodiments, the feature extraction engine 111 may select the expanded representation set from the plurality of expanded representation sets based at least in part on an event associated with each event. For example, the feature extraction engine 111 may select the expanded representation set associated with the most recent event.

At step/operation 2202, the feature extraction engine 111 may generate a compact event representation. In some embodiments, the feature extraction engine 111 may generate the compact event representation by utilizing a feature aggregation machine learning model to process the plurality of expanded representations associated with the expanded representation set. In some embodiments, the feature aggregation machine learning model may process the plurality of expanded representations and perform one or more mathematical or logical operations on the plurality of expanded representations to generate a compact event representation. In some embodiments, the feature aggregation model may aggregate each expanded representation of the selected expanded representation set into a compact event representation.

FIG. 23 depicts an operational example of generating a compact event representation. The feature extraction engine 111 may select an expanded representation set comprising the expanded representations 2304-2306, 2307-2309, and 2310-2312 each corresponding to a categorical input feature 2301, 2302, and 2303 respectively. Similarly to the step/operations described with respect to FIGS. 14-15, a channel aggregation machine learning model 2313 may generate the expanded representations 2314-2316 comprising the expanded representation set. Each expanded representation 2314-2316 of the expanded representation set may be processed by the feature aggregation machine learning model 2317 to generate the compact event representation 2318.

Figure 24B:
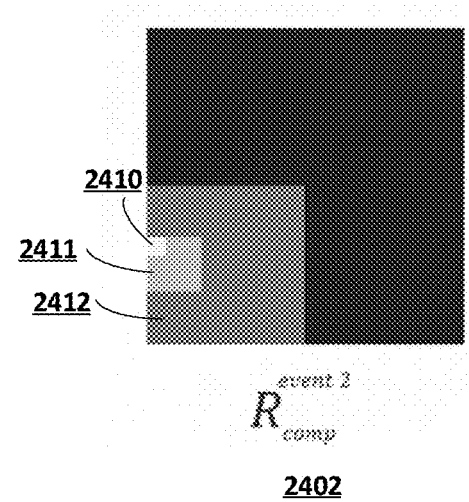
Figure 24C:
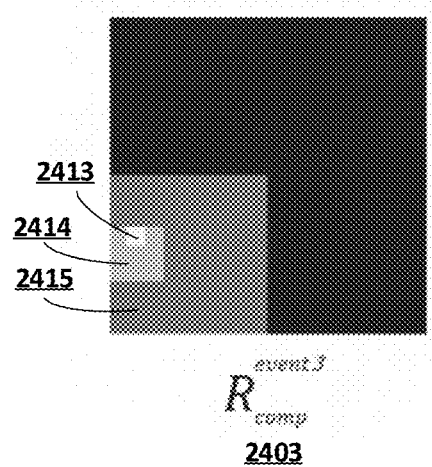

FIGS. 24A-C depict operational examples of a compact event representation. FIG. 24A depicts a compact event representation 2401 indicative of expanded representations corresponding to two categorical input features. The two categorical input features may comprise a structure text input feature "A53" and "D99." Compact event representation 2401 may comprise image channel representation regions 2404-2409, each corresponding to a character pattern present in the two categorical input features. For example, image channel representation region 2405 may correspond to the character pattern "A5" and image channel representation region 2404 may correspond to the character pattern "A53." FIGS. 24B-C also depict compact event representations 2402 and 2403, each corresponding to one categorical input feature. Compact event representation 2402 may comprise image channel representation regions 2410-2412 and compact event representation 2403 may comprise image channel representation regions 2413-2415.

In some embodiments, step/operation 505 may also be performed in accordance with the various steps/operations of the process 2500 that is depicted in FIG. 25, which is a flowchart diagram of an example process for generating a historical representation of a cumulative compact event representation. The process 2500 begins at step/operation 2501 when feature extraction engine 111 generates a predecessor subset for a plurality of compact event representations. In some embodiments, the feature extraction engine 111 may generate the predecessor subset for the plurality of compact event representations associated with the same event.

At step/operation 2502, feature extraction engine 111 may generate a cumulative compact event representation based at least in part on the predecessor subset. For example, a predecessor subset may comprise three compact event representations. The feature extraction engine 111 may generate a cumulative compact event representation comprising the three compact event representation by aggregating the first compact event representation with the second compact event representation and then aggregating the third compact event representation.

At step/operation 2503, feature extraction engine 111 may generate a historical representation based at least in part on each cumulative compact event representation. For example, the historical representation may comprise each cumulative compact event representation.

An operational example of generating a historical representation based at least in part on each cumulative event representation 2600 is depicted in FIG. 26. The feature extraction engine 111 may generate a predecessor subset comprising three compact event representations. The feature extraction engine 111 may then generate a cumulative compact event representation for the first compact event representation. 2601. The first compact event representation 2601 may depict two categorical input features comprising a structure text input feature "A53" and "D99." Compact event representation 2601 may comprise image channel representation regions 2404-2409, each corresponding to a character pattern present in the two categorical input features. For example, image channel representation region 2605 may correspond to the character pattern "A5" and image channel representation region 2604 may correspond to the character pattern "A53." The feature extraction engine 111 may then generate a cumulative compact event representation 2602 based at least in part on the compact event representation 2601. The cumulative compact event representation 2602 may comprise image channel representation regions 2604-2609, as depicted from the compact event representation 2601 and also image channel representation regions 2610-2612 as described by an additional categorical input feature. Similarly, the feature extraction engine 111 may generate a cumulative compact event representation 2603 based at least in part on the cumulative compact event representation 2602. The cumulative compact event representation 2603 may comprise image channel representation regions 2604-2612, as depicted from the cumulative compact event representation 2602 and also image channel representation region 2613 as described by an additional categorical input feature.

In some embodiments, step/operation 505 may also be performed in accordance with the various steps/operations of the process 2700 that is depicted in FIG. 27 which is a flowchart diagram of an example process for generating a cumulative compact event representation for a plurality of categorical input features. In some embodiments, the plurality of categorical input features comprise different structure text input feature types. For example, the plurality of categorical input features may contain categorical input features describing an ICD code, HIC code, and CPT code. The process 2700 begins at step/operation 2701 when feature extraction engine 111 generates a plurality of compact event representations for each of the plurality of categorical input features. In some embodiments, the plurality of categorical input features correspond to the same event.

At step/operation 2702, the feature extraction engine 111 generates a cumulative compact event representation for each structure input feature type. In some embodiments, this step/operation may be substantially similar to step/operation 2502. By way of continuing example, feature extraction engine 111 may generate three cumulative compact event representations, each containing the plurality of compact event representations corresponding to the ICD code, the HIC code, or the CPT code structure text input feature type.

At step/operation 2703, the feature extraction engine 111 may generate a historical representation for the plurality of cumulative compact event representations. In some embodiments, the feature extraction engine 111 may process the plurality of cumulative compact event representations using a feature type aggregation machine learning model. In some embodiments, the feature type aggregation machine learning model may be a trained machine learning model configured to process each cumulative compact event representation of the plurality of cumulative compact event representations and perform one or more mathematical or logical operations on the plurality of cumulative compact event representations to generate a historical representation. In some embodiments, the historical representation may display the aggregation of each cumulative compact event representation corresponding to a categorical feature type.

In some embodiments, in order to conserve processing power, categorical input feature types with a large plurality of associated character pattern positions, and therefore image channel representations, may be broken into one or more sections such that each categorical input feature section may be treated as an individual categorical input feature. Once the categorical input feature is separated into one or more sections, step/operations 2701-2703 may be performed such that a historical representation may be generated by feature extraction engine 111 using the feature type aggregation machine learning model. The resulting historical representation would display the aggregation of each portion of the categorical input feature.

An operational example of generating a historical representation based at least in part the plurality of cumulative event representation 2800 is depicted in FIG. 28. The feature extraction engine 111 may receive a plurality of compact event representations corresponding to a plurality of categorical input features 2801-2803. The plurality of categorical input features may each correspond to a type of structure text input feature (e.g., type 1 that corresponds to the categorical input feature 2801, type that corresponds to the categorical input feature 2 2802, and type 3 that corresponds to the categorical input feature 2803). By way of continuing example, each of the plurality of received categorical input features may correspond to an ICD code, a HIC code, or a CPT code structure text input feature type. The feature extraction engine 111 may process each compact event representation to generate a cumulative compact event representation 2804-2806. In some embodiments, the generated cumulative compact event representations may each correspond to a specific type of structure text input feature such that cumulative compact event representation 2804 corresponds to structure text input feature type 1, cumulative compact event representation 2805 corresponds to structure text input feature type 2, and cumulative compact event representation 2806 corresponds to structure text input feature type 3. In some embodiments, each cumulative compact event representation may have an associated channel size data object indicative of the number of pixels corresponding to the length and width of cumulative compact event representation. The feature extraction engine 111 may use feature type aggregation machine learning model 2807 to process the plurality of cumulative compact event representations 2804-2806 to generate historical representation 2808.

Historical representation 2808 may describe each cumulative compact event representation corresponding to each structure text input feature type for the plurality of categorical input features. In some embodiments, feature extraction engine 111 may concatenate the cumulative compact event representations 2804-2806 such that each cumulative compact event representation is incorporated in the historical representation 2808. This may be accomplished by appending cumulative compact event representations 2804-2806 adjacent to one another such that the channel size data object associated with the historical representation is based at least in part on the channel size data object from each cumulative compact event representation 2804-2806. For example, cumulative compact event representation 2804 may have an associated channel size data object describing a dimension length of 400 pixels and a dimensions width of 400 pixels, cumulative compact event representation 2805 may have an associated channel size data object describing a dimension length of 299 pixels and a dimensions width of 299 pixels, and cumulative compact event representation 2805 may have an associated channel size data object describing a dimension length of 79 pixels and a dimensions width of 249 pixels. The feature extraction engine 111 may use feature type aggregation machine learning model 2807 to process cumulative compact event representations 2804-2806 such that historical representation 2808 has an associated channel size data object describing a dimension length of 400 pixels and a dimensions width of 700 pixels. As such, feature type aggregation machine learning model 2807 may generate a historical model with associated channel size data object describing a dimension length of 400 pixels and a dimensions width of 700 pixels. The first cumulative compact event representation may be incorporated between the length 2810 (0 to 400 pixels) and width 2809 (0 to 400 pixels). The second cumulative compact event representation may be placed adjacent to the first cumulative compact event representation such that the second cumulative compact event representation may be incorporated between the length 2812 (0 to 299 pixels) and width 2811 (401 to 700 pixels). The third cumulative compact event representation may be placed adjacent to the first cumulative compact event representation and second cumulative compact event representation such that the third cumulative compact event representation may be incorporated between the length 2814 (300 to 379 pixels) and width 2813 (401 to 650 pixels). In some embodiments, the feature type aggregation machine learning model 2807 may additionally generate one or more filler pixels such that the historical representation 2808 is rectangular. Filler pixels may be incorporated between the length 2816 (380 to 400 pixels) and width 2815 (651 to 700 pixels).

At step/operation 403, the predictive analysis engine 112 processes the one or images using an image-based machine learning model to generate one or more predictions. Examples of an image-based machine learning models include a machine learning model that utilizes a convolutional neural network (CNN). Other examples of an image-based machine learning model include a feedforward neural network. In some embodiments, the image-based machine learning model may utilize a CNN in coordination with one or more other machine learning models.

In some embodiments, step/operation 403 may be performed in accordance with the CNN architecture 2900 depicted in the block diagram of FIG. 29. As depicted in FIG. 29, the predictive analysis engine 112 receives one or more images 2901 generated by the feature extraction engine 111 using one or more input layers 2902. As further depicted in FIG. 29, the predictive analysis engine 112 utilizes one or more feature learning layers 2903 to process the output of the one or more input layers 2902 to generate one or more convolutional layer outputs. In some embodiments, the one or more feature learning layers 2903 are configured to perform a combination of one or more successive feature learning routines, where each feature learning routine of the one or more successive feature routines includes performing a convolutional operation (e.g., a convolutional operation using one or more kernels and/or one or more filters) followed by an activation operation (e.g., a rectified linear unit (ReLU) activation operation) and followed by a pooling operation (e.g., a non-linear downsampling operation, such as a max pool operation). For example, as depicted in the block diagram of FIG. 30, the one or more feature learning layers 2903 may include two successive feature learning routines, i.e., a first convolutional operation performed by a first convolutional layer 3001, followed by a first activation operation by a first activation layer 3002, followed by a first pooling operation by a first pooling layer 3003, followed by a second convolutional operation by a second convolutional layer 3004, followed by a second activation operation by a second activation layer 3005, and followed by a second pooling operation by a second pooling layer 3006.

As further depicted in FIG. 29, the predictive analysis engine 112 utilizes one or more prediction layers 2904 to process the one or more convolutional layer outputs generated by the one or more feature learning layers 2903 to generate one or more raw prediction outputs. In some embodiments, the one or more prediction layers 2904 including one or more fully connected neural network layers. For example, as depicted in the block diagram of FIG. 31, the one or more prediction layers 2904 may include a flattening layer 3101 configured to generate a flattened version of the one or more convolutional layer outputs generated by the one or more feature learning layers 2903, two fully connected layers 3102-3103, and a normalization layer 3104 (e.g., a SoftMax normalization layer). Moreover, the predictive analysis engine 112 utilizes one or more output layers 2905 to generate one or more predictions 2906 based at least in part on the raw prediction outputs generated by the one or more prediction layers 2904.

At step/operation 404, the predictive analysis engine 112 performs a prediction-based action based at least in part on the predictions generated in step/operation 403. Examples of prediction-based actions include transmission of communications, activation of alerts, automatic scheduling of appointments, and/or the like. As a further example, the predictive analysis engine 112 may determine based at least in part on operational data associated with one or more medical institutions that the one or more medical institutions exhibit patterns of wasteful and/or fraudulent insurance claim filings.

Training Image-Based Prediction Models

FIG. 32 is a flowchart diagram of an example process 3200 for training a machine learning model for performing image-based predictive data analysis. Via the various steps/operations of the process 3200, the predictive data analysis computing entity 106 can train a machine learning model to process categorical input features (e.g., structured text input features) to generate one or more predictive data analysis conclusions.

The process 3200 begins at step/operation 3201 when the feature extraction engine 111 obtains/receives one or more training data objects, where each training data object includes one or more categorical training input features and one or more ground-truth determinations for the one or more categorical input features. For example, the one or more training categorical input features in a particular training data object may include one or more patient features for a patient, while the one or more ground-truth determinations in the particular training data object may include particular health information (e.g., particular diagnostic information) associated with the patient predictive entity. As another example, the one or more training categorical input features in a particular training data object may include one or more operational features for a medical provider predictive entity, while the one or more ground-truth determinations in the particular training data object may include particular operational information (e.g., particular operational statistics) associated with the medical predictive entity. The feature extraction engine 111 may retrieve the categorical input features from the training data 122 stored on the storage subsystem and/or receive the categorical input features from the training data 122 from one or more external computing entities 102.

At step/operation 3202, the feature extraction engine 111 generates one or more images based at least in part on the one or more training data objects obtained/received in step/operation 3201. For example, the feature extraction engine 111 may process the one or more categorical training input features associated with the training data objects (e.g., in accordance with a process substantially similar to the process 400 of FIG. 4) to generate one or more images based at least in part on the one or more training data objects obtained/received in step/operation 3201. In some embodiments, the feature extraction engine 111 provides the generated one or more images to the predictive analysis engine 112.

At step/operation 3203, the predictive analysis engine 112 generates one or more predictions based at least in part on the one or more images generated in step/operation 3204. For example, the predictive analysis engine 112 may process the one or more images generated by the predictive analysis engine 112 (e.g., using a CNN, such as the CNN architecture 2900 of FIG. 29) to generate one or more predictions based at least in part on the one or more images generated by the feature extraction engine 111 in step/operation 3202. In some embodiments, the predictive analysis engine 112 provides the generated one or more predictions to the training engine 113. At step/operation 3204, the training engine 113 generates an error model based at least in part on the one or more predictions. In some embodiments, the training engine 113 generates a measure of deviation between each of the one or more predictions and a corresponding ground-truth determination in a training data object associated with the particular prediction. The training engine 113 may then compute an overall error measure based at least in part on the measure of deviation. The training engine 113 may then generate the error model as a model that relates the overall error measure to one or more trainable parameters of the machine learning model (e.g., at least one of one or more trainable parameters associated with the feature extraction engine 111 and one or more trainable parameters associated with the predictive analysis engine 112). At step/operation 3205, the training engine 113 generates updated values for one or more trainable parameters of the machine learning model in a manner that achieves an optimization of the error model. In some embodiments, the training engine 113 may generate the updated values for the one or more trainable parameters of the machine learning model in a manner that achieves a local optimization of the error model. In some embodiments, the training engine 113 may generate the updated values for the one or more trainable parameters of the machine learning model in a manner that achieves a global optimization of the error model. In some embodiments, to generate the updated values for the one or more trainable parameters of the machine learning model in a manner that achieves an optimization of the error model, the training engine 113 uses one or more training algorithms, such as a gradient-descent-based training algorithm.

Although the techniques described herein for generating image representations of categorical feature data are explained with reference to performing predictive data analysis, a person of ordinary skill in the relevant technology will recognize that the disclosed techniques have applications far beyond performing predictive data analysis. As an illustrative example, the disclosed techniques can be used in various data visualization applications. As another illustrative example, the disclosed techniques can be used to encode data in image-based data structures that facilitate at least one of data retrieval and data security. As yet another example, the disclosed techniques can be utilized to enhance various steganography techniques. As a further illustrative example, the disclosed techniques can be used to process and store data in spatial-temporal databases. In some embodiments, the disclosed techniques can be used to generate video representations of categorical feature data, e.g., video representations that illustrate changes in the corresponding categorical feature over time.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for dynamically generating an image-based prediction, the computer-implemented method comprising:
receiving, using one or more processors, a categorical input feature, wherein the categorical input feature comprises a plurality of character patterns for a plurality of character pattern positions, wherein each character pattern position is associated with a plurality of candidate character patterns;
generating, using the one or more processors, an image representation of the categorical input feature, wherein: (i) the image representation comprises a plurality of image channel representations each associated with a character pattern position of the plurality of character pattern positions, (ii) each image channel representation comprises a plurality of image channel representation regions, (iii) each image channel representation region for an image channel representation corresponds to a candidate character pattern for the character pattern position that is associated with the image channel representation region, and (iv) generating an image channel representation that is associated with a character pattern position is determined based at least in part on the character pattern that is associated with the character pattern position for the image channel representation;
generating, using the one or more processors, the image-based prediction based at least in part on the image representation; and
performing, using the one or more processors, one or more prediction-based actions based at least in part on the image-based prediction.

2. The computer-implemented method of claim 1, wherein:
the plurality of image channel representations is associated with an image channel order that is determined based at least in part on a character pattern position order of the plurality of character patterns, and
generating the image representation comprises:
determining a low-ordered subset of the plurality of image channel representations that comprises all of the plurality of image channel representations except a highest-ordered image channel representation as determined based at least in part on the image channel order; and
for each image channel representation in the low-ordered subset that is selected in accordance with the image channel order starting with an in-subset highest-ordered image channel representation in the low-ordered subset:
identifying a successor image channel representation of the plurality of image channel representations for the image channel representation based at least in part on the image channel order,
updating a channel size dimension data object for the image channel representation based at least in part on a successor channel size dimension data object for a predecessor image channel representation, and
updating the image channel representation by resizing image channel representation for the image channel representation based at least in part on the channel size dimension data object.

3. The computer-implemented method of claim 2, wherein generating the image representation further comprises:
determining a high-ordered subset of the plurality of image channel representations that comprises all of the plurality of image channel representations except a lowest-ordered image channel representation of the plurality of image channel representations as determined based at least in part on the image channel order; and
for each image channel representation in the high-ordered subset starting with an in-subset lowest-ordered image channel representation in the high-ordered subset:
generating an image location for the image channel representation in the lowest-ordered image channel representation based at least in part on each predecessor image channel representation for the image channel representation as determined based at least in part on the image channel order, and
updating the image channel representation by integrating the image channel representation into the lowest-ordered image channel representation in accordance with the image location.

4. The computer-implemented method of claim 1, wherein:
the categorical input feature is selected from a plurality of categorical input features;
each image channel representation is associated with a co-ordered channel set that is associated with the plurality of categorical input features; and
generating the image representation comprises:
for each image channel representation, processing the co-ordered channel set for the image channel representation using a channel aggregation machine learning model for the co-ordered channel set in order to generate the image representation as an expanded representation set for the image channel representation.

5. The computer-implemented method of claim 4, wherein:
the expanded representation set is selected from a plurality of expanded representation sets for a plurality of events;
each expanded representation set comprises a plurality of expanded representations for the plurality of image channel representations; and
the computer-implemented method further comprises:
for each image channel representation:
generating, using the one or more processors, a per-channel representation segment based at least in part on each expanded representation for the plurality of expanded representations that is associated with the image channel representation; and
generating, using the one or more processors, a historical representation based at least in part on the per-channel representation segment.

6. The computer-implemented method of claim 5, generating the historical representation for a particular image channel representation comprises:
for each event, generating a cumulative expanded representation with respect to the particular channel representation based at least in part on a temporally precedent subsegment of the per-channel representation segment for the particular image channel representation; and
generating the historical representation based at least in part on at least one cumulative expanded representation.

7. The computer-implemented method of claim 6, wherein generating the historical representation based at least in part on the at least one cumulative expanded representation comprises generating the historical representation based at least in part on the cumulative expanded representation for a latest event of the plurality of events.

8. The computer-implemented method of claim 4, wherein:
the expanded representation set comprises a plurality of expanded representations for the plurality of image channel representations; and
the computer-implemented method further comprises generating a compact event representation based at least in part on processing the plurality of expanded representations using a feature aggregation machine learning model.

9. The computer-implemented method of claim 8, wherein:
the compact event representation is selected from a plurality of compact event representations for a plurality of events; and
the computer-implemented method further comprises:
generating a historical representation based at least in part on each compact event representation.

10. The computer-implemented method of claim 9, wherein generating the historical representation based at least in part on each compact event representation:
for each event:
generating a predecessor subset of the plurality of compact event representations, and
generating a cumulative compact event representation based at least in part on the predecessor subset; and
generating the historical representation based at least in part on each cumulative compact event representation.

11. The computer-implemented method of claim 10, wherein:
the compact event representation is selected from the plurality of compact event representations corresponding to a plurality of categorical input features, and wherein the plurality of categorical input features comprise one or more structure text input feature types; and
the computer implemented method further comprises:
generating a cumulative compact event representation for each structure text input feature type of the plurality of categorical input features, and
generating the historical representation based at least in part on each cumulative compact event representation based at least in part on processing a plurality of cumulative compact event representations using a feature type aggregation machine learning model.

12. An apparatus for dynamically generating an image-based prediction, the apparatus comprising one or more processors and at least one memory including program code, the at least one memory and the program code configured to, with the one or more processors, cause the apparatus to at least:
receive a categorical input feature, wherein the categorical input feature comprises a plurality of character patterns for a plurality of character pattern positions, wherein each character pattern position is associated with a plurality of candidate character patterns;
generate an image representation of the categorical input feature, wherein: (i) the image representation comprises a plurality of image channel representations each associated with a character pattern position of the plurality of character pattern positions, (ii) each image channel representation comprises a plurality of image channel representation regions, (iii) each image channel representation region for an image channel representation corresponds to a candidate character pattern for the character pattern position that is associated with the image channel representation region, and (iv) generating an image channel representation that is associated with a character pattern position is determined based at least in part on the character pattern that is associated with the character pattern position for the image channel representation;
generate the image-based prediction based at least in part on the image representation; and
perform one or more prediction-based actions based at least in part on the image-based prediction.

13. The apparatus of claim 12, wherein:
the plurality of image channel representations is associated with an image channel order that is determined based at least in part on a character pattern position order of the plurality of character patterns, and
generating the image representation comprises:
determining a low-ordered subset of the plurality of image channel representations that comprises all of the plurality of image channel representations except a highest-ordered image channel representation as determined based at least in part on the image channel order; and
for each image channel representation in the low-ordered subset that is selected in accordance with the image channel order starting with an in-subset highest-ordered image channel representation in the low-ordered subset:
identifying a successor image channel representation of the plurality of image channel representations for the image channel representation based at least in part on the image channel order,
updating a channel size dimension data object for the image channel representation based at least in part on a successor channel size dimension data object for a predecessor image channel representation, and
updating the image channel representation by resizing image channel representation for the image channel representation based at least in part on the channel size dimension data object.

14. The apparatus of claim 13, wherein generating the image representation further comprises:
determining a high-ordered subset of the plurality of image channel representations that comprises all of the plurality of image channel representations except a lowest-ordered image channel representation of the plurality of image channel representations as determined based at least in part on the image channel order; and
for each image channel representation in the high-ordered subset starting with an in-subset lowest-ordered image channel representation in the high-ordered subset:
generating an image location for the image channel representation in the lowest-ordered image channel representation based at least in part on each predecessor image channel representation for the image channel representation as determined based at least in part on the image channel order, and
updating the image channel representation by integrating the image channel representation into the lowest-ordered image channel representation in accordance with the image location.

15. The apparatus of claim 12, wherein:
the categorical input feature is selected from a plurality of categorical input features;
each image channel representation is associated with a co-ordered channel set that is associated with the plurality of categorical input features; and
generating the image representation comprises:
for each image channel representation, processing the co-ordered channel set for the image channel representation using a channel aggregation machine learning model for the co-ordered channel set in order to generate the image representation as an expanded representation set for the image channel representation.

16. The apparatus of claim 15, wherein:
the expanded representation set is selected from a plurality of expanded representation sets for a plurality of events;
each expanded representation set comprises a plurality of expanded representations for the plurality of image channel representations; and
the computer-implemented method further comprises:
for each image channel representation:
generating, using the one or more processors, a per-channel representation segment based at least in part on each expanded representation for the plurality of expanded representations that is associated with the image channel representation; and
generating, using the one or more processors, a historical representation based at least in part on the per-channel representation segment.

17. The apparatus of claim 16, generating the historical representation for a particular image channel representation comprises:
for each event, generating a cumulative expanded representation with respect to the particular channel representation based at least in part on a temporally precedent subsegment of the per-channel representation segment for the particular image channel representation; and
generating the historical representation based at least in part on at least one cumulative expanded representation.

18. The apparatus of claim 17, wherein generating the historical representation based at least in part on the at least one cumulative expanded representation comprises generating the historical representation based at least in part on the cumulative expanded representation for a latest event of the plurality of events.

19. The apparatus of claim 15, wherein:
the expanded representation set comprises a plurality of expanded representations for the plurality of image channel representations; and
the compluter-implemented method further comprises generating a compact event representation based at least in part on processing the plurality of expanded representations using a feature aggregation machine learning model.

20. A computer program product for dynamically generating an image-based prediction, the computer program product comprising at least one non-transitory computer-readable storage medium having computer-readable program code portions stored therein, the computer-readable program code portions configured to:
receive a categorical input feature, wherein the categorical input feature comprises a plurality of character patterns for a plurality of character pattern positions, wherein each character pattern position is associated with a plurality of candidate character patterns;
generate an image representation of the categorical input feature, wherein: (i) the image representation comprises a plurality of image channel representations each associated with a character pattern position of the plurality of character pattern positions, (ii) each image channel representation comprises a plurality of image channel representation regions, (iii) each image channel representation region for an image channel representation corresponds to a candidate character pattern for the character pattern position that is associated with the image channel representation region, and (iv) generating an image channel representation that is associated with a character pattern position is determined based at least in part on the character pattern that is associated with the character pattern position for the image channel representation;
generate the image-based prediction based at least in part on the image representation; and
perform one or more prediction-based actions based at least in part on the image-based prediction.

* * * * *